(12) United States Patent
Didey et al.

(10) Patent No.: US 10,780,978 B2
(45) Date of Patent: Sep. 22, 2020

(54) DRIVE SYSTEM FOR AIRCRAFT LANDING GEAR

(71) Applicant: AIRBUS OPERATIONS LIMITED, Bristol (GB)

(72) Inventors: Arnaud Didey, Bristol (GB); Fraser Wilson, Bristol (GB); Stephen Briancourt, Bristol (GB); Phillip Teague, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 874 days.

(21) Appl. No.: 15/302,886

(22) PCT Filed: Apr. 9, 2015

(86) PCT No.: PCT/GB2015/051085
§ 371 (c)(1),
(2) Date: Oct. 7, 2016

(87) PCT Pub. No.: WO2015/155538
PCT Pub. Date: Oct. 15, 2015

(65) Prior Publication Data
US 2017/0029096 A1    Feb. 2, 2017

(30) Foreign Application Priority Data

Apr. 10, 2014  (GB) .................................. 1406467.9
Dec. 4, 2014   (GB) .................................. 1421523.0

(51) Int. Cl.
*B64C 25/40*     (2006.01)
*F16D 3/18*      (2006.01)
(Continued)

(52) U.S. Cl.
CPC ............ *B64C 25/405* (2013.01); *B64C 25/44* (2013.01); *F16C 23/086* (2013.01); *F16D 3/185* (2013.01);
(Continued)

(58) Field of Classification Search
CPC ....... B64C 25/405; B64C 25/44; B64C 25/34; F16C 23/086; F16C 2326/43; F16D 3/185
(Continued)

(56) References Cited

U.S. PATENT DOCUMENTS 2,408,163 A     9/1946  Fodor
3,070,979 A *   1/1963  Shipley .................. F16D 3/185
                                               464/154
(Continued)

FOREIGN PATENT DOCUMENTS

DE        4328477 A1     3/1994
DE      102004012842 A1  10/2005
(Continued)

OTHER PUBLICATIONS

International Search Report and Written Opinion of the ISA dated Jul. 2, 2015 International Application No. PCT/IB2015/051085.

Primary Examiner — Marc Burgess
(74) Attorney, Agent, or Firm — Nixon & Vanderhye P.C.

(57) ABSTRACT

A drive system for an aircraft landing gear is described. The drive system includes a drive pinion, a drive shaft arranged to rotate the drive pinion about a drive axis, and a casing which rotatably supports the drive shaft. The drive pinion is rotatably supported on the casing by a self-aligning bearing. The drive pinion is coupled to the drive shaft by a flexible coupling adapted to transfer torque between the drive pinion and the drive shaft and to permit tilting of the drive pinion relative to the drive axis.

20 Claims, 15 Drawing Sheets

(51) Int. Cl.
  *B64C 25/44* (2006.01)
  *F16C 23/08* (2006.01)
  *B64C 25/34* (2006.01)

(52) U.S. Cl.
  CPC .......... *B64C 25/34* (2013.01); *F16C 2326/43* (2013.01); *Y02T 50/823* (2013.01)

(58) Field of Classification Search
  USPC ................................................ 464/158–159
  See application file for complete search history.

(56) References Cited

U.S. PATENT DOCUMENTS

| | | | | |
|---|---|---|---|---|
| 3,850,389 | A * | 11/1974 | Dixon | B64C 25/40 244/103 S |
| 4,006,946 | A * | 2/1977 | Mann | F16C 23/086 384/558 |
| 4,021,161 | A * | 5/1977 | McDermott | F01C 21/003 418/61.3 |
| 4,453,830 | A * | 6/1984 | Jameson | B28C 5/0831 366/63 |
| 8,857,544 | B2 * | 10/2014 | Essinger | B64C 25/405 180/65.51 |
| 8,979,019 | B2 * | 3/2015 | Christensen | B64C 25/405 244/100 R |
| 9,359,068 | B2 * | 6/2016 | Oswald | B64C 25/405 |
| 9,469,397 | B2 * | 10/2016 | Didey | B64C 25/405 |
| 9,499,260 | B2 * | 11/2016 | Christensen | B64C 25/405 |
| 9,738,376 | B2 * | 8/2017 | Didey | B64C 25/34 |
| 10,214,281 | B2 * | 2/2019 | Morris | B64C 25/405 |
| 2006/0065779 | A1 | 3/2006 | McCoskey et al. | |
| 2012/0153075 | A1 * | 6/2012 | Wilson | B64C 25/405 244/50 |
| 2012/0228921 | A1 | 9/2012 | Essinger et al. | |
| 2013/0200210 | A1 * | 8/2013 | Oswald | B64C 25/405 244/50 |
| 2013/0233969 | A1 | 9/2013 | Charles et al. | |
| 2014/0158820 | A1 | 6/2014 | Wilson et al. | |
| 2014/0225421 | A1 | 8/2014 | Oswald et al. | |
| 2014/0245853 | A1 | 9/2014 | Didey | |
| 2014/0284421 | A1 | 9/2014 | Osman et al. | |
| 2015/0210384 | A1 * | 7/2015 | Geck | B64C 25/405 244/50 |

FOREIGN PATENT DOCUMENTS

| | | |
|---|---|---|
| EP | 0260196 A1 | 3/1988 |
| EP | 2639160 A2 | 9/2013 |
| EP | 2783980 A2 | 10/2014 |
| FR | 2388162 A1 | 11/1978 |
| WO | 2011023505 A2 | 3/2011 |
| WO | 2011073590 A1 | 6/2011 |
| WO | 2012171589 A1 | 12/2012 |
| WO | 2014023939 A1 | 2/2014 |

* cited by examiner

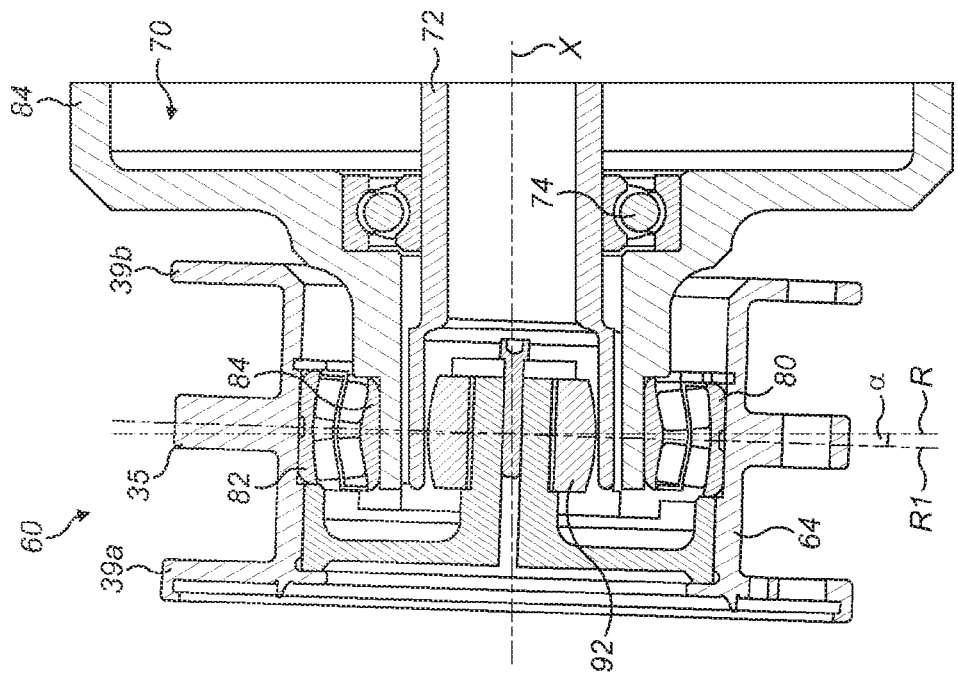
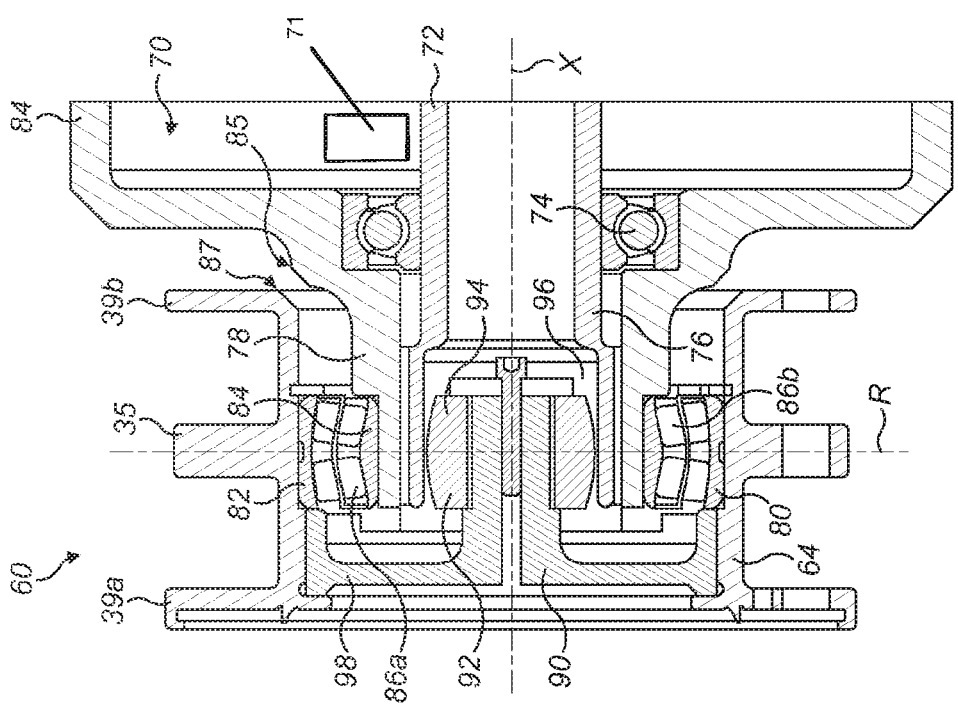

DRIVE SYSTEM FOR AIRCRAFT LANDING GEAR

RELATED APPLICATIONS

The present application is a National Phase International Application Number PCT/GB2015/051085, filed Apr. 9, 2015, which claims priority from Great Britain Application Number 1406467.9, Apr. 10, 2014, and Great Britain Application Number 1421523.0, filed Dec. 4, 2014.

FIELD OF THE INVENTION

The present invention relates to a drive system for rotating one or more wheels of an aircraft landing gear for the purposes of ground taxiing (forwards or reverse) and/or wheel spin-up prior to landing and/or for applying braking torque to the rotating wheel(s).

BACKGROUND OF THE INVENTION

Aircraft are required to ground taxi between locations on airfields. An example is taxiing between a runway and the location (e.g. terminal gate) at which the aircraft's passengers are to board or disembark. Typically, such taxiing is achieved by using the thrust from the aircraft's engines to propel the aircraft forwards so that the landing gear wheels are caused to rotate. Since ground taxi speeds are necessarily relatively low, the engines must be run at a very low power. This means that there is a relatively high fuel consumption as a result of the poor propulsion efficiency at this low power. This leads to an increased level of both atmospheric and noise pollution locally around airports. Moreover, even when the engines are run at low power it is generally necessary to apply the wheel brakes to limit ground taxi speeds, leading to a high degree of brake wear.

Reversing of a civil aircraft, e.g. away from a terminal gate, using its main engines is not permitted. When reversing is necessary, or in other situations where ground taxiing via main engine thrust is not practicable, tow trucks are used to manoeuvre aircraft around. This process is laborious and costly.

There is therefore a need for a drive system to power the wheels of an aircraft landing gear during ground taxi operations. There is also a desire to use such a drive system to pre-spin the wheels prior to landing, and/or for applying braking torque to the rotating wheel(s) by converting kinetic energy to electrical energy using the drive system motor as a generator.

Several autonomous ground taxi systems for both driving the wheels while the aircraft is on the ground and spinning them up prior to landing have been proposed in recent years. An example is disclosed in US2006/0065779, which proposes a powered nose aircraft wheel system in which a clutch is used to switch between a mode in which the wheel can spin freely and a mode in which the wheel can be driven by an electric motor. The clutch can also operate to enable the motor to pre-spin the wheel prior to landing.

A prior art arrangement which is not restricted to nose landing gears is described in WO2011/023505. The disclosed system uses an actuator to move a drive pinion in and out of driving engagement with a driven gear mounted to the wheel hub. WO2014/023939 describes a further prior art arrangement, similar in many respects to WO2011/023505, in which one of the drive pinion and the driven gear comprises a sprocket, and the other of the drive pinion and the driven gear comprises a series of rollers arranged to form a ring, each roller being rotatable about a roller axis at a fixed distance from an axis of rotation of the drive pinion or driven gear, respectively.

SUMMARY OF THE INVENTION

A first aspect of the invention provides a drive system for an aircraft landing gear, the drive system comprising: a drive pinion; a drive shaft arranged to rotate the drive pinion about a drive axis; and a casing which rotatably supports the drive shaft, wherein the drive pinion is rotatably supported on the casing by a self-aligning bearing, and wherein the drive pinion is coupled to the drive shaft by a flexible coupling adapted to transfer torque between the drive pinion and the drive shaft and to permit tilting of the drive pinion relative to the drive axis.

A further aspect of the invention provides an aircraft landing gear having the drive system of the first aspect.

The term "drive pinion" is used here to refer to any gear or sprocket used to transmit mechanical power to another element of a drive train by meshing engagement.

The term "casing" is used here to refer to any housing, enclosure, covering, sheath, tube or box.

The term "rotatably support" is used here to refer to any part supported by another and which permits relative rotation between the parts.

The term "self-aligning bearing" is used here to refer to a bearing between a shaft and a housing which is insensitive to shaft deflections and angular misalignment between the shaft and the housing. The degree of deflection or misalignment is generally limited to relatively small angles before adverse effects on bearing performance are observable. Such bearings are also known as mis-alignment bearings.

The term "flexible coupling" is used here to refer to a device used to join two pieces of rotating equipment for transmitting torque while permitting some degree of misalignment and/or end movement.

The flexible coupling may include a flexible diaphragm. For example, the flexible diaphragm may have a radially inner portion coupled to one end of the drive shaft and a radially outer portion coupled to the drive pinion. The flexible diaphragm may, for example, be formed as a wheel or hub having a flexible annular disk connecting the radially inner portion and the radially outer portion. The diaphragm has a relatively high radial stiffness to transmit torque and a relatively low axial stiffness to permit rotations (tilting) of the drive pinion relative to the drive axis.

Alternatively, the flexible coupling may include a crowned spline joint. For example, the crowned spline joint may include a female part having a plurality of internal straight splines, and a male part having a plurality of external crowned splines. Each crowned spline may have an opposed pair of sides, an opposed pair of ends, and a top which runs along the length of the spline between its opposed pair of ends and provides an outer diameter of the spline. The outer diameter of each crowned spline may reach a maximum at or near its centre and gradually decrease either side of the maximum towards its opposed ends.

The crowned spline joint may alternatively include a plurality of ball splines each formed by a respective line of balls, and each line of balls is received in a respective crowned groove.

The flexible coupling may alternatively include a constant velocity joint (or CV joint). CV joints come in a variety of forms and any of these may be used, e.g. a tripod joint, Rzeppa joint, double Cardan joint, or any other suitable CV joint.

The self-aligning bearing may be substantially centrally located across the width of the drive pinion, i.e. the dimension parallel with the drive axis.

The flexible coupling may provide up to around 5 degrees of rotation (axial misalignment) between the drive pinion and the drive axis, preferably at least around 1.5 degrees, preferably around 1.5 to around 3 degrees, preferably around 1.5 to around 2.5 degrees, preferably around 2 degrees.

The self-aligning bearing may include a plurality of rolling elements arranged in one or more raceways. The rolling elements may be ball bearings or spherical rollers, for example. A spherical roller is a barrel shaped roller with a spherical or part-spherical surface.

The self-aligning bearing may be, for example: a two-row spherical roller bearing; a single-row spherical roller (or barrel bearing); a ball radial spherical double-row bearing; or a ball radial spherical single-row bearing. The self-aligning bearing may include a spherical outer raceway. This is a common feature of each of the self-aligning bearings listed above.

The spherical raceway of the self-aligning bearing and the crowned spline of the flexible coupling may have substantially concentric spheres. In practice the small angles of rotation being accommodated may tolerate some (small) displacement of sphere centres.

Alternatively the self-aligning bearing may include an inner spherical surface in contact with an outer spherical surface. The self-aligning bearing may not have any rolling elements. The bearing may operate by sliding contact between the inner and outer spherical surfaces.

The self-aligning bearing may substantially prevent translation of the drive pinion along the drive axis.

The casing and the drive pinion may each include a stop to prevent excessive rotation (axial misalignment) of the drive pinion with respect to the drive axis. For example, the stops may prevent excessive rotation (e.g. 10 degrees or more) that would only be experienced in a failure condition and prevent potential over rotation and jamming of the drive pinion against the casing. The drive pinion and casing have a clearance at the maximum degree of rotation expected in normal use.

The drive system may further comprise a reduction gear arrangement. The drive shaft may be an output shaft of the reduction gear arrangement, or alternatively the drive shaft may be coupled to an output shaft of the reduction gear arrangement. The casing may be a housing of the reduction gear arrangement.

The drive system may further comprise a driven gear arranged to mesh with the drive pinion to be rotatable by the drive pinion, the driven gear being connectable to a wheel of an aircraft landing gear to be capable of rotating the wheel.

The term "wheel" of the aircraft landing gear is used here in its conventional sense to refer to a ground wheel which contacts the ground surface when the aircraft is supported by the ground and is not airborne.

One of the drive pinion and the driven gear may comprise a sprocket and the other of the drive pinion and the driven gear may comprises a series of rollers arranged to form a ring, each roller being rotatable about a roller axis at a fixed distance from an axis of rotation of the drive pinion or driven gear, respectively.

Each of the series of rollers is rotatable about a pin, the pins being fixed at least at one end to an annular support member. The roller drive pinion/driven gear may therefore be formed as a roller gear or roller chain, such as described in WO2014/023939, for example.

The sprocket has teeth having a tooth width and the rollers have a roller width. The width of the rollers may be greater than the width of teeth to accommodate the tilting of the drive pinion relative to the drive axis when the drive pinion and the driven gear are rotating in mesh.

In an alternative arrangement, the drive pinion and the driven gear may be meshing spur gears or other toothed gears such as described in WO2011/023505, for example.

The drive system may further comprise a motor. The term "motor" is used here in its conventional sense to refer to a machine whereby some source of energy (e.g. electric, pneumatic, hydraulic, etc.) is used to give motion. It is to be understood that the motor may be a motor-generator, which, in addition to its function as a motor, is operable as a generator whereby mechanical energy is converted into electrical energy.

The terms "drive" and "driven" are used here with reference to the "drive pinion" and the "driven gear" refer to convey the sense of power transfer when the motor is operable to rotate the wheel of the aircraft landing gear. It will, of course, be appreciated that where the motor is a motor-generator and is acting as a generator the "driven gear" will in fact be the driving element which drives the "drive pinion" and therefore the generator. The generator may be used to apply a braking torque to the wheel.

The drive system may have a first configuration in which the drive pinion is capable of meshing with the driven gear to permit the motor to drive the driven gear.

The drive system may also have a second configuration in which the drive pinion is not capable of meshing with the driven gear.

Movement between the first and second configurations may be effected by an actuator.

The driven gear may be adapted to be mounted to a hub of the wheel, preferably to an outer rim of the hub.

BRIEF DESCRIPTION OF THE DRAWINGS

Embodiments of the invention will now be described with reference to the accompanying drawings, in which:

FIG. 6 shows a cross section view of the drive pinion mounted on gearbox in greater detail;

FIG. 7 shows the a deflected state of rotation of the drive pinion with respect to the gearbox output shaft;

DETAILED DESCRIPTION OF EMBODIMENT(S)

An embodiment of the invention is shown in FIGS. 1 to 5. In the illustrated embodiment the landing gear has two wheels, but the principles of the embodiment may be applied to landing gear having any number of wheels, including one. The embodiment shows a main landing gear (i.e. a landing gear attached to wing structure or fuselage structure in the region of the wings), since the weight supported by the main landing gear is considered to provide the best traction between the wheels and the ground to enable reliable aircraft ground taxiing. However, the drive system of the present invention may alternatively be applied to a nose landing gear (i.e. a steerable landing gear towards the nose of the aircraft). The main landing gear shown is applicable to a single aisle passenger airliner (approximately 150-200 pax), although it will be appreciated that this invention has wide applicability to a variety of aircraft types and weights, including civil aircraft, military aircraft, helicopters, passenger aircraft (<50 pax, 100-150 pax, 150-250 pax, 250-450 pax, >450 pax), freighters, tilt-rotor aircraft, etc.

Figure 1:
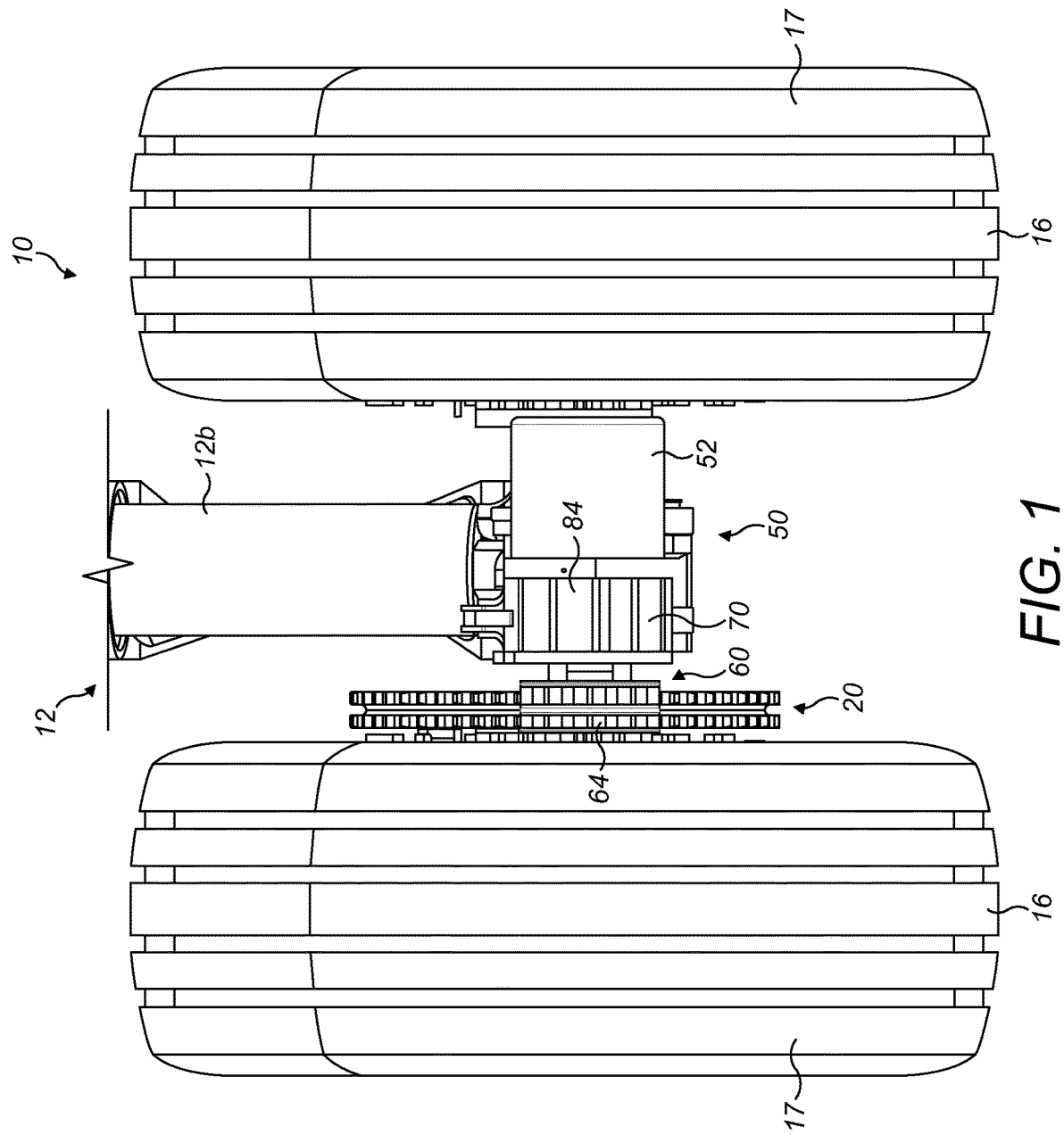
FIG. 1 shows a rear view of an aircraft landing gear having a drive system.
Figure 2:
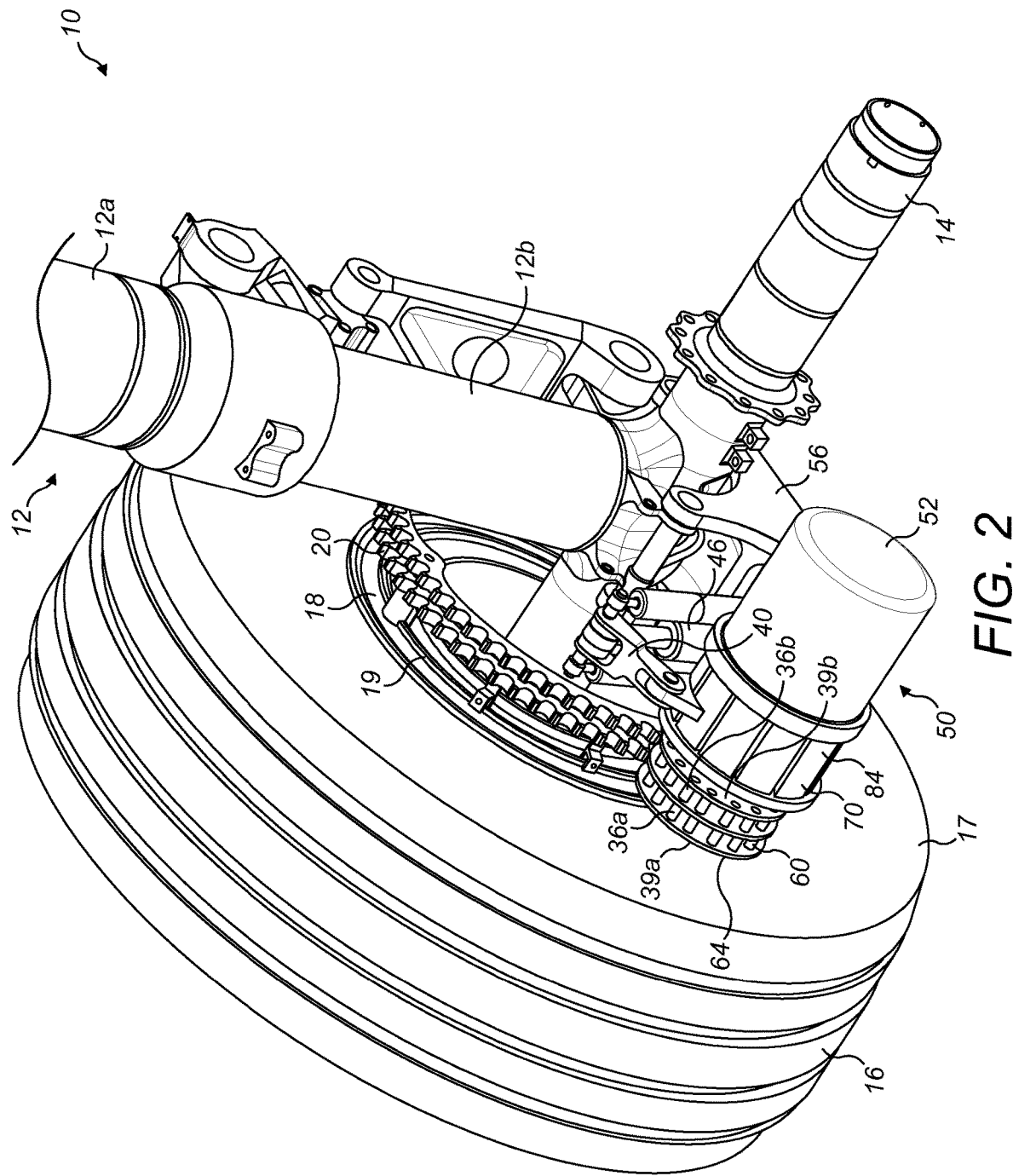
FIG. 2 shows an isometric view of the drive system of FIG. 1.
Figure 3:
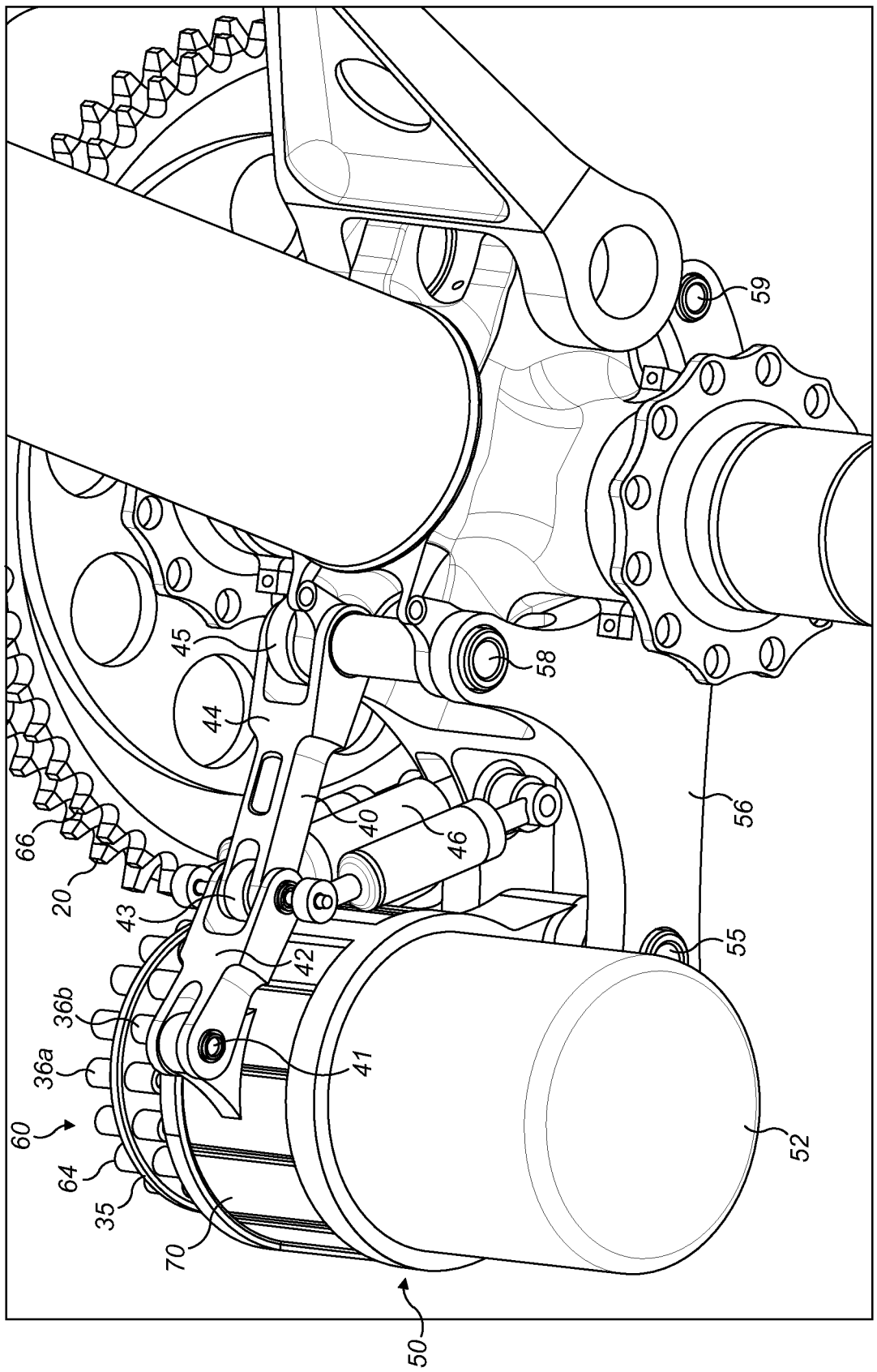
FIG. 3 shows a detailed isometric view of the drive system of FIG. 1.

The landing gear 10 includes a telescopic shock-absorbing main leg 12, including an upper telescopic part 12a (main fitting) and a lower telescopic part 12b (slider). The upper telescopic part 12a is attached to the aircraft fuselage or wing (not shown) by its upper end (not shown). The lower telescopic part 12b supports an axle 14 carrying a pair of wheels 16, one on either side of the main leg, (only one wheel 16 is shown in FIG. 2, for clarity. The wheels 16 are arranged to rotate about the axle 14 to enable ground movement of the aircraft, such as taxiing or landing.

Each wheel 16 comprises a tyre 17 supported by a hub 18. Each wheel hub 18 has a rim 19 for holding the Lyre. The wheel drive system 50 includes a driven gear 20 attached to the hub 18 so as to be rotatable with the wheel 16. In the illustrated embodiment the driven gear 20 comprises a sprocket 66 which is a wheel-type sprocket having two coaxial rings of radially-extending sprocket teeth. The sprocket-to-hub interface may be a rigid attachment or alternatively may include a flexible interface to permit some angular deflection of the sprocket with respect to the wheel hub to accommodate deflections of the landing gear structure.

The drive system 50 further comprises a motor 52 which is configured to rotate a drive pinion 60 via a gearbox 70. The drive pinion 60 is a roller gear 64 formed by a rigid annular ring 35 and a series of pins (not shown) projecting from both sides of the annular ring 35. A first series of rollers 36a rotatably supported by the pins is provided on one side of the annular ring 35, and a second series of rollers 36b rotatably supported by the pins is provided on the other side of the annular ring. Each series of rollers 36a, 36b extend around the annular ring to form a continuous track. First and second lateral annular rings 39a, 39b sandwich the first and second series of rollers 36a, 36b. The pins supporting the first series of rollers 36a extend between the annular ring 35 and the first lateral annular ring 39a, and the pins supporting the second series of rollers 36b extend between the annular ring 35 and the second lateral annular ring 39b. The annular ring 35 therefore forms a central spine for supporting the pins.

In the illustrated embodiment the gearbox 70 is an epicyclic reduction gearbox which provides a drive path between the motor 52 and the drive pinion 60. The motor is an electric motor which drives an input shaft of the drive path. An output shaft (or drive shaft) 72 of the drive path is coaxial with the input shaft and is also coaxial with the axis of rotation of the motor. The drive pinion 60 is mounted on the output shaft 72. The casing may be a housing of a reduction gear arrangement 71.

The gearbox 70 has a housing (or casing) 84 to which the motor 52 is fixed on one side and from which the output shaft having the drive pinion 60 projects on the opposite side. The lower part of the housing 84 has a projecting lug which is pivotally connected at 55 to a mounting bracket 56. The mounting bracket is fixedly attached to the axle 14 at the base of the slider 12b. The mounting bracket 56 extends beneath the axle 14 is attached by mounting pin 58, 59 to aft and fore mounting points respectively on the axle 14. The mounting pins 58, 59 permit ready detachment of the bracket from the landing gear.

A lock-stay 40 is coupled between the bracket 56 (at the mounting pin 58) and the gearbox housing 84. The lock-stay 40 comprises a first lock-link 42 and a second lock-link 44. The first lock-link 42 has a first end pivotally connected to the gearbox housing 84 at 41 and a second end pivotally connected to the second lock-link at 43. The second lock-link has a first end pivotally connected to the first lock-link at 43 and a second end pivotally connected to the bracket 56 at 45 and shares the mounting pin 58.

The lock-stay 40 provides a mechanism for moving the drive system between a first configuration in which the drive pinion 60 is in meshing engagement with the driven gear 20 and a second configuration in which the drive pinion 60 is physically disengaged and not capable of meshing with the driven gear 20. Articulation of the lock-stay 40 causes the gearbox housing 84 to pivot about its pivotal connection 55 with respect to the fixed bracket 56. This pivotal movement of the gearbox housing 84 causes the drive pinion 60 to move between its engaged and disengaged configurations with the driven gear 20.

This movement is effected by an actuator. In the illustrated embodiment the actuator is a linear actuator 46. The linear actuator 46 is pivotally connected at one end to the bracket 56 and at its other end to the pivotal connection 43 between the first and second lock-links of the lock-stay.

Figure 4:
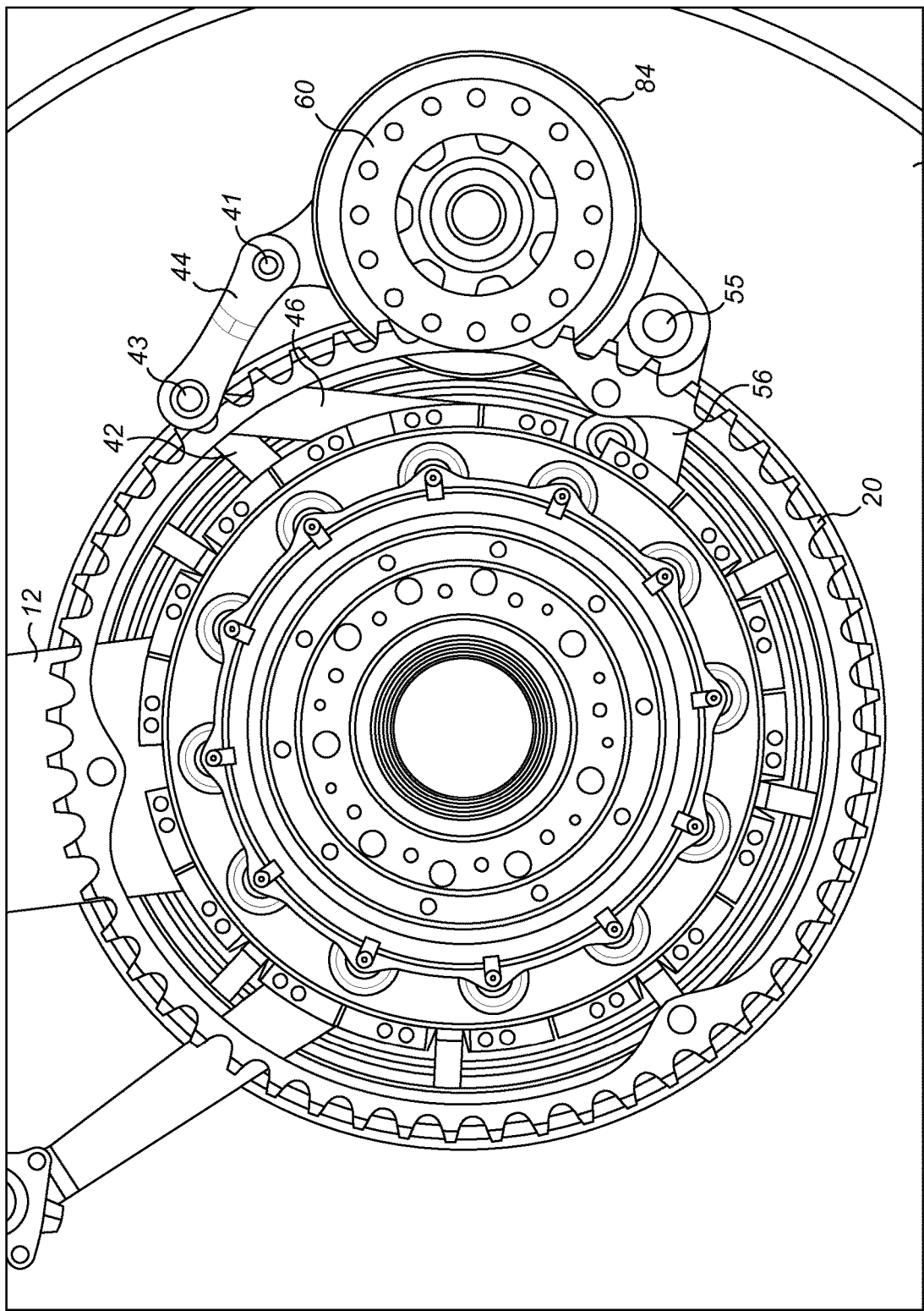
FIG. 4 shows a side view of selected components of the drive system of FIG. 1 in the engaged position.
Figure 5:
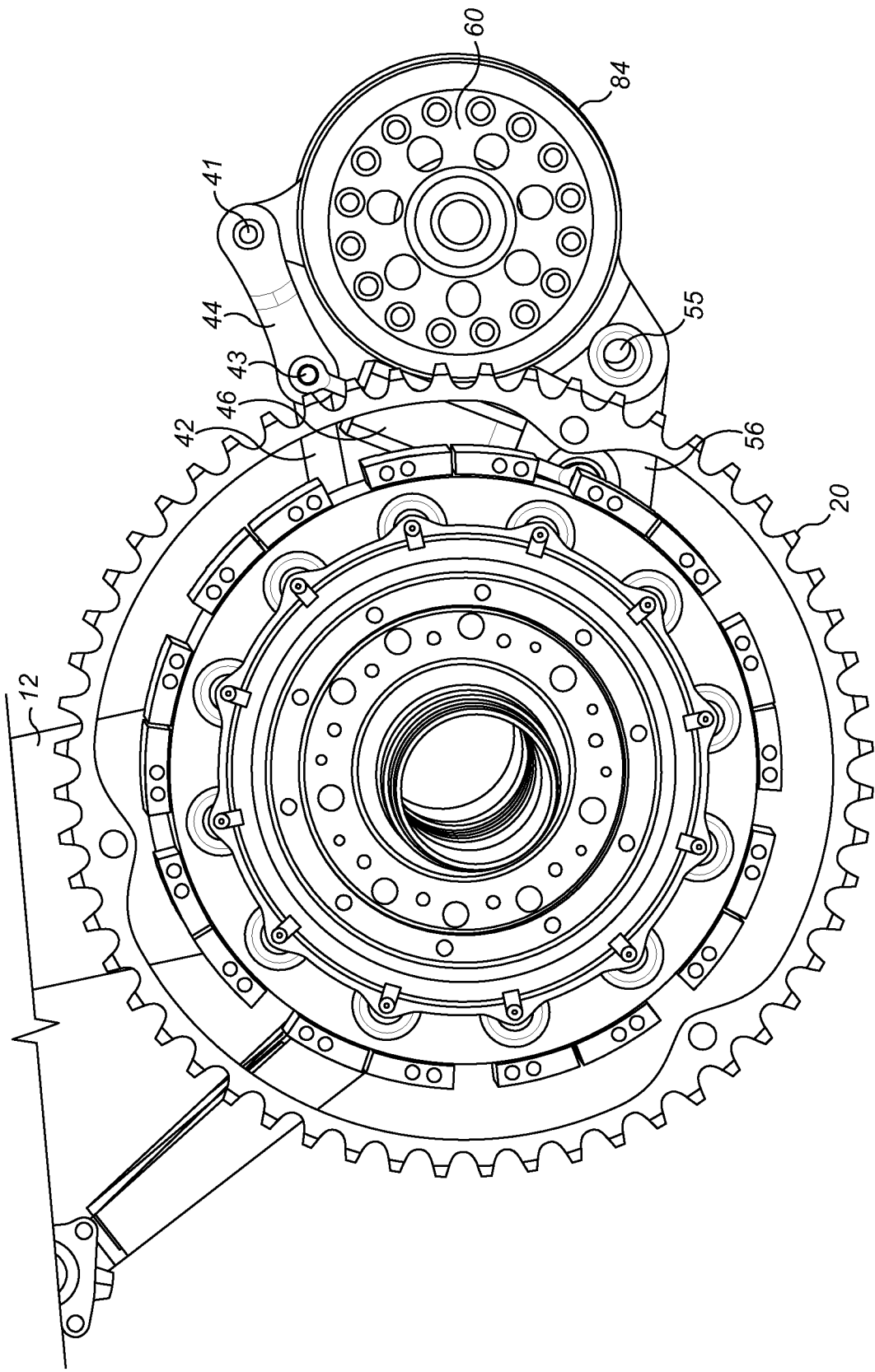
FIG. 5 shows a side view of selected components of the drive system of FIG. 1 in the disengaged position.

FIG. 4 shows the linear actuator 46 fully extended so as to move the drive pinion into meshing engagement with the driven gear 20—the first configuration of the drive system 50. FIG. 5 shows the linear actuator 46 fully retracted so as to move the drive pinion out of meshing engagement with the driven gear 20 to be physically separate from the driven gear 20—the second configuration of the drive system 50.

FIG. 6 shows the mounting of the drive pinion 60 on the output shaft of the gearbox 70 in greater detail. In FIG. 6, the rollers 36a, 36b of the roller gear 64 are not shown but the apertures (bores) in the annular rings 35, 39a, 39b for receiving the pins supporting the rollers are visible. FIG. 6 is a cross-section view through the centre of the output shaft 72.

As can be seen, the output shaft 72 is rotatably supported by the gearbox housing 84 by bearing 74. In this embodiment the bearing 74 is a rolling element bearing, and in particular is a ball bearing having a single raceway. It is not required that the bearing 74 provides angular misalignment between the gearbox housing 84 and the output shaft 72. However, it will be appreciated that the bearing 74 may be a self-aligning bearing, for example where bending of the output shaft 72 under load needs to be accommodated by the bearing 74. Desirably, the bearing 74 is disposed close to the end 76 of the output shaft 72, i.e. the end closest to the drive pinion 60. Positioning of the bearing 74 in this way minimises the length of the cantilevered free end 76 of the output shaft 72.

The gearbox housing 84 includes a projecting portion 78 formed as a substantially cylindrical turret which surrounds the end 76 of the output shaft 72. The projecting portion 78 fits within and is surrounded by the drive pinion 60.

The drive pinion 60 is rotatably supported on the gearbox housing (the projecting portion 78) by a self-aligning bearing 80. The self-aligning bearing 80 is disposed centrally across the width of the drive pinion 60. That is to say, the self-aligning bearing 80 is coincident with the annular ring 35 of the roller gear 64. In the embodiment illustrated in FIG. 6 the self-aligning bearing is a spherical roller bearing having two rows of spherical rollers. The outer ring of the bearing 80 has a spherical internal surface. The inner ring 84 includes two raceways (each having a spherical surface) inclined at an angle to the bearing axis R. The two rows of spherical rollers 86a, 86b fit between the two raceways of the inner ring 84 and the common sphered raceway of the outer ring 82. The spherical internal surface of the outer ring 82 enables misalignment between the outer ring 82 and the inner ring 84 about the bearing axis R.

The drive pinion 60 is coupled to the output shaft 72 by a flexible coupling 90 adapted to transfer torque between the output shaft 72 and the drive pinion 60 and to permit tiling of the drive pinion 60 relative to a drive axis X of the output shaft 72. In the embodiment illustrated in FIG. 6 the flexible coupling 90 comprises a crowned spline joint 92. The crowned spline joint includes a plurality of external crowned splines 94 received within a corresponding plurality of internal straight splines 96. The internal straight splines are integrally formed in the end 76 of the output shaft 72. It will be appreciated that the internal straight splines 96 may alternatively be formed in a separate component attached to the output shaft 72. The external crowned splines 94 are provided on a component fixed to a hub 98 which supports the drive pinion 60. The hub 98 is substantially rigid and fixed to the crowned spline component and to the drive pinion 60. The substantially rigid hub 98 provides minimal axial deflection between the crowned spline component and the drive pinion 60.

The external crowned splines 94 can tilt relative to the internal straight splines 96 of the crowned spline joint 92 so as to provide rotation between the drive pinion 60 and the drive axis X of the output shaft 72. The crowned spline joint 92 transfers torque between the output shaft 72 and the drive pinion 60. In the embodiment illustrated in FIG. 6 the centre of the crowned splines 94 are coincident with the bearing axis R of the self-aligning bearing 80. It is particularly preferred, although not necessary, that the crowned splines 94 and the spherical inner surface of the outer ring 82 are the self-aligning bearing 80 are concentric spheres.

FIG. 6 illustrates the drive pinion 60 in an aligned state in which the axis of rotation of the drive pinion 60 is coaxial with the drive axis X of the output shaft 72.

FIG. 7 illustrates the same components in a misaligned state in which the outer ring 82 of the self-aligning bearing 80 has a bearing axis R1 offset at an angle alpha to the bearing axis R of the inner ring 84 of the self-aligning bearing 80. This annular misalignment is accommodated also by the crowned spline joint 82 of the flexible coupling 90 such that the drive pinion 60 has an axis of rotation inclined by the same angle alpha to the drive axis X of the output shaft 72.

Referring back to FIG. 1, the landing gear experiences many different modes of deformation during use. In particular, each wheel axle 14 is deflected relative to the landing gear leg 12 as a result of the vertical loads due to the weight of the aircraft and the horizontal loads applied during braking. In addition, the shape of each wheel rim 19 is deformed (to a lozenge or an oval, shape—so called "ovalisation") due to tyre loads. Each deformation mode typically provides deformation within the range of +/−10 mm at the extremities of the wheel. For example, the vertical height of the wheel may be reduced by 10 mm as a result of wheel distortion by tyre loads, and the wheel may tilt through about 2 to 3 degrees as a result of axle bending caused by vertical aircraft loads, resulting in a displacement of about 10 mm at the periphery of the wheel rim.

The deformation modes discussed above can result in misalignment and/or distortion within the drive system 50 since the drive pinion 60 is mounted from the axle/slider of the landing gear, while the driven gear 20 is mounted on the wheel 16. The axle deflections can result in a tilt of the driven gear 20 with respect to the pinion gear 60, i.e. the rotational axis of these gears are tilted with respect to one another. The self-aligning bearing 80 and the flexible coupling 90 enable the pinion gear 60 to tilt with respect to the drive axis of the output shaft 72 so as to accommodate the angular deflection of approximately 1.5 to 3 degrees of the driven gear 20 under the deformation modes discussed above. In fact, the self-aligning bearing 80 and the flexible coupling 90 may accommodate rotation of the drive pinion 60 with respect to the drive axis X up to angles of around 5 degrees. The self-aligning bearing 80 and the flexible coupling 90 therefore serve to isolate the gearbox 70 from these landing gear deformations.

As discussed above the drive pinion 60 is constrained against movement in the axial direction of the drive axis X whilst the drive pinion 60 has freedom to tilt relative to the drive axis X. The sprocket of the driven gear 20 has teeth having a tooth width. The rollers 39a, 39b of the roller gear drive pinion have a roller width. The width of the rollers is desirably greater than the width of the teeth to accommodate this tilting of the drive pinion relative to the drive axis when the drive pinion and the driven gear are rotating in mesh.

As shown in FIG. 6, the housing 84 and the drive pinion 60 each include a stop 85, 87, respectively. These stops prevent excessive rotation of the drive pinion with respect to the drive axis. For example, the stops may prevent excessive rotation (e.g. 10 degrees or more) that would only be experienced in a failure condition and prevent potential over rotation and jamming of the drive pinion against the casing. The drive pinion and casing have a clearance at the maximum degree of rotation expected in normal use.

Figure 9:
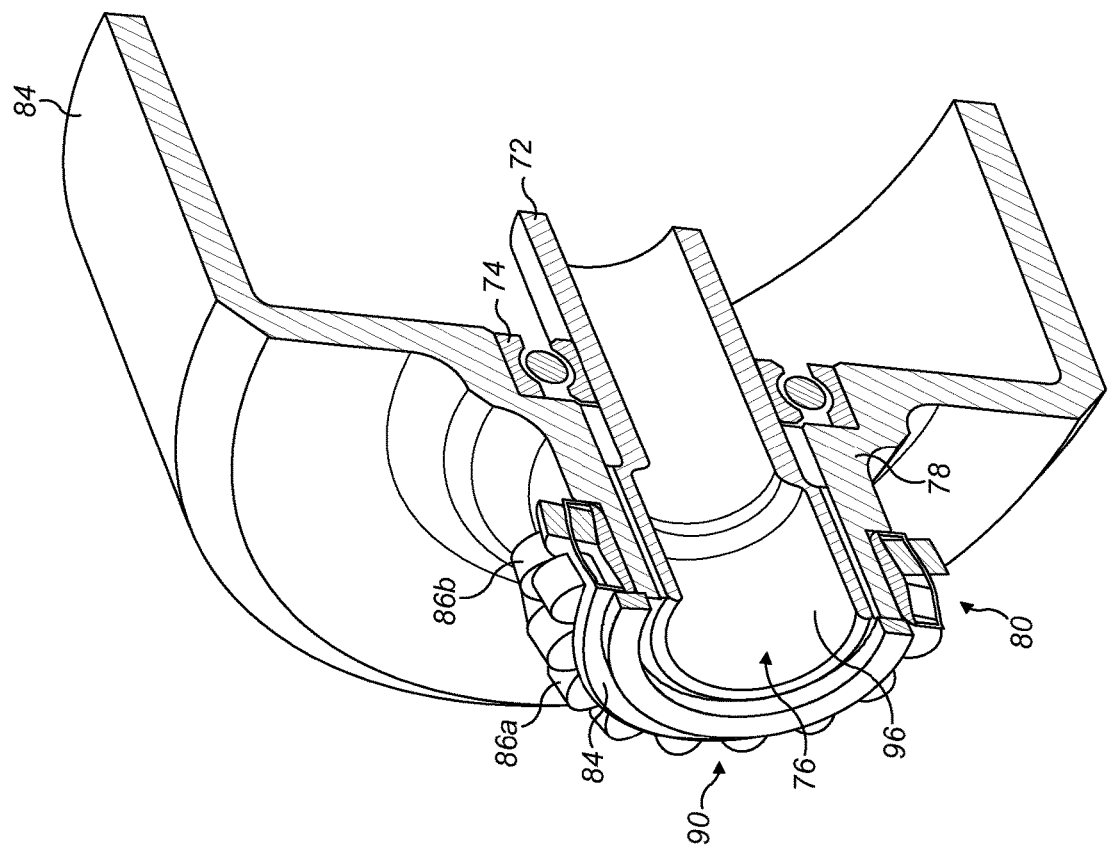
FIGS. 8 and 9 illustrate a disassembled view of the drive pinion mounting.
Figure 8:
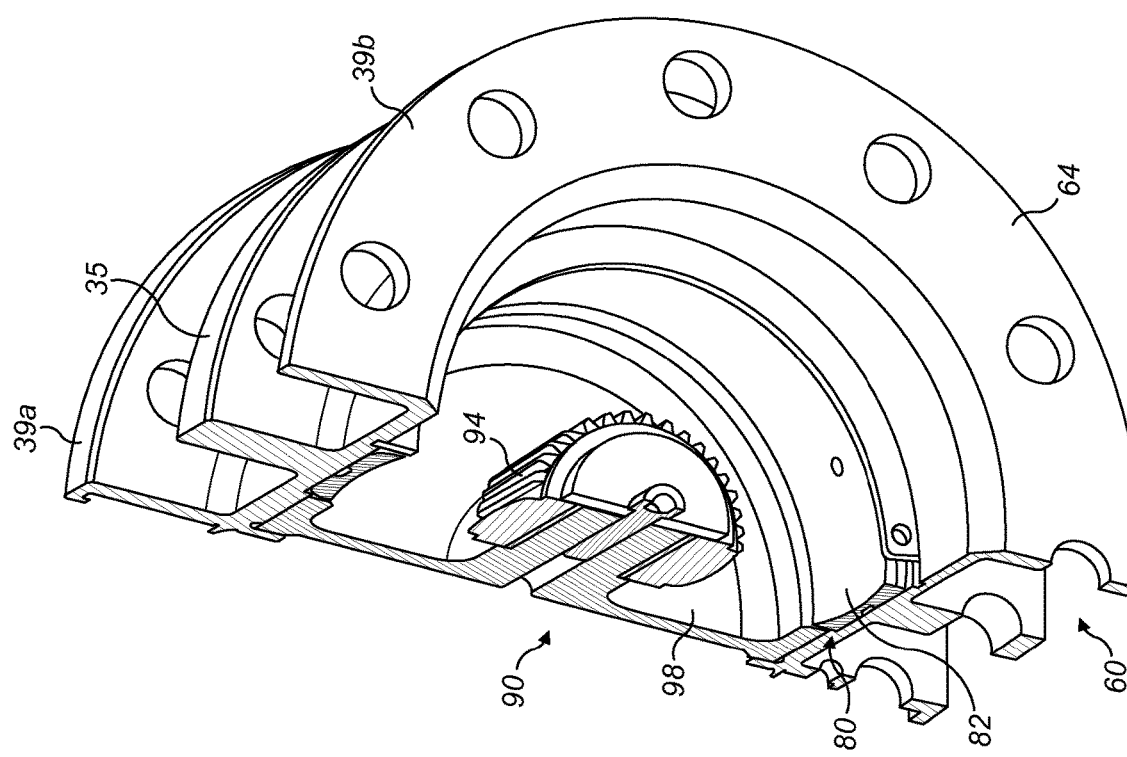

FIGS. 8 and 9 illustrate a disassembled view of the drive pinion mounting, with FIG. 8 illustrating the drive pinion 60, the crowned splines 94 of the flexible coupling 90 and the outer race 82 of the self-aligning bearing 80, and FIG. 9 illustrating the inner ring 84 and spherical rolling elements 84*a*, 84*b* of the self-aligning bearing 80 and the internal straight splines 96 of the flexible coupling 90.

Figure 11:
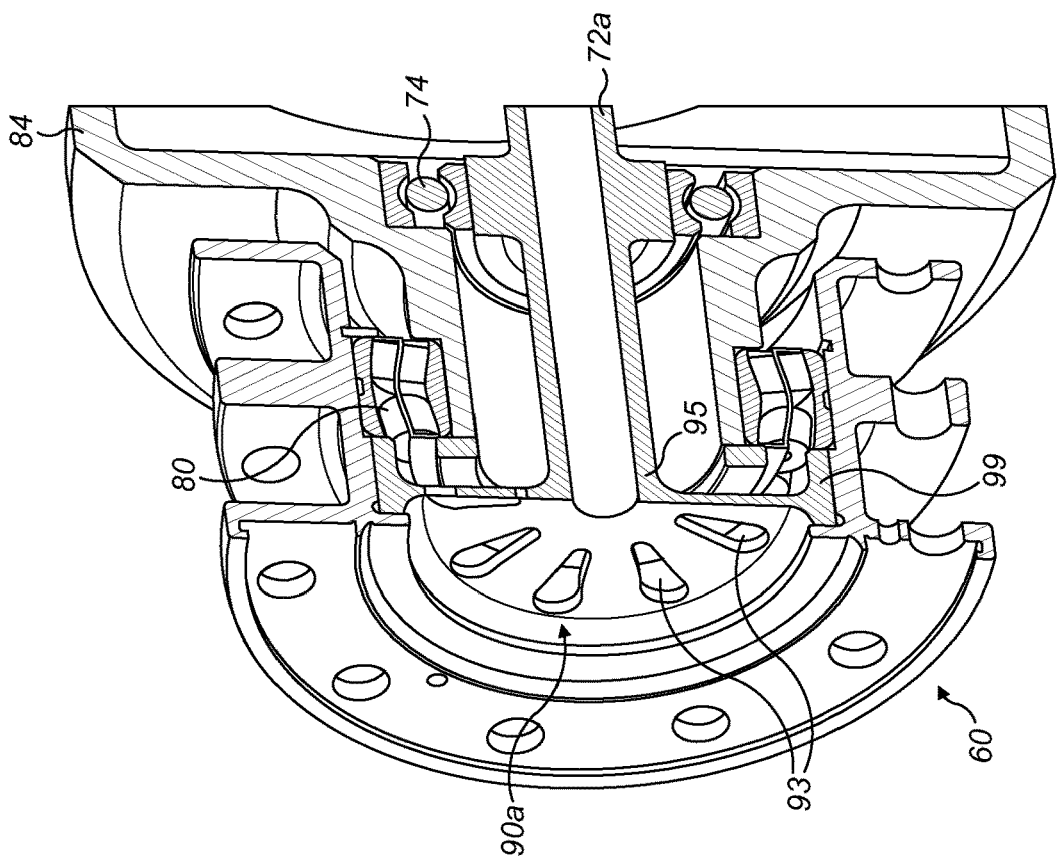
FIGS. 10 and 11 illustrate an alternative arrangement of the flexible coupling in which a flexible diaphragm is used.
Figure 10:
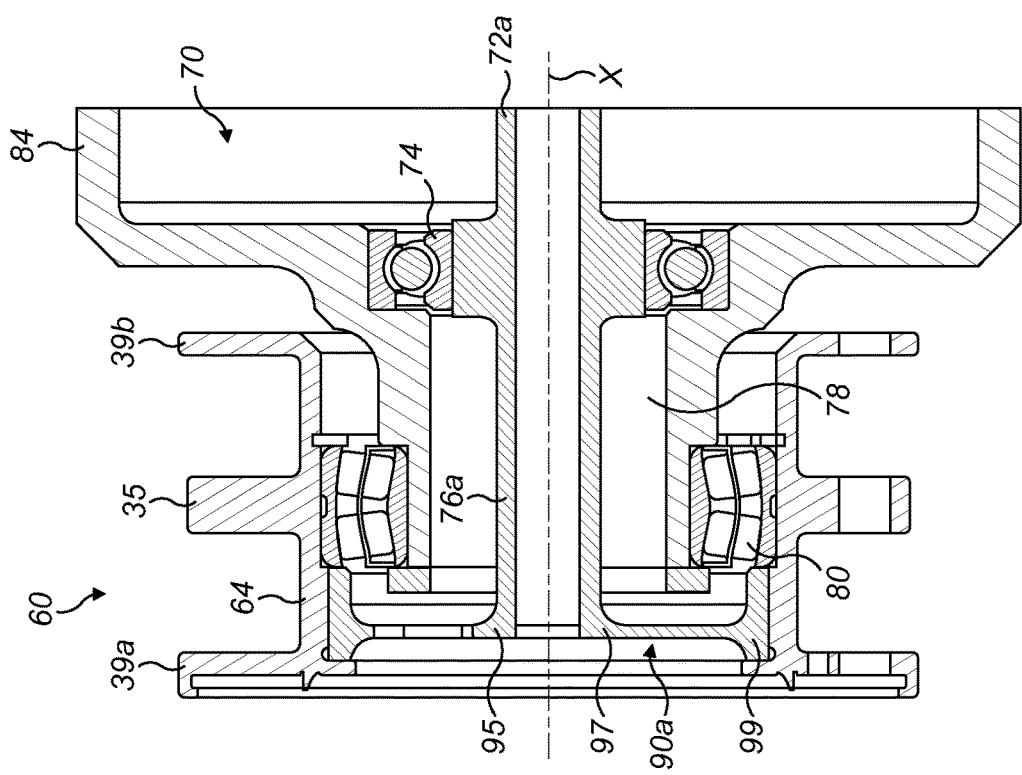

FIGS. 10 and 11 illustrate an alternative arrangement of the flexible coupling in which a flexible diaphragm is used instead of the crowned spline joint of the embodiment illustrated in FIGS. 6 to 9. In FIGS. 10 and 11 those components of the drive system 50 which are identical to those of the FIG. 6 embodiment are denoted by like reference numerals. In particular, the drive pinion 60, the gearbox 70, the self-aligning bearing 80 and the bearing 74 are identical to those parts of the FIG. 6 embodiment described above.

In the FIG. 10 embodiment the flexible coupling 90*a* performs the same function of transferring torque between the drive pinion 60 and the drive shaft 72*a* and to permit tilting of the drive pinion 60 relative to the drive axis X of the drive shaft 72*a*. The flexible coupling 90*a* includes a flexible diaphragm 95. The flexible diaphragm has a radially inner portion 97 coupled to the distal end 76*a* of the drive shaft 72*a*, and a radially outer portion 99 coupled to the drive pinion 60. In the illustrated embodiment the flexible diaphragm 95 is integrally formed with the distal end 76*a* of the drive shaft 72*a*.

The flexible diaphragm 95 is formed as a hub, similar to the hub 96 of the FIG. 6 embodiment but the radial disc extending between the radial inner portion 95 and the radial outer portion 99 has a significantly thinner wall thickness as compared with the corresponding portion of the hub 96. As best shown in FIG. 11, the disc includes a plurality of cut-outs 93. This construction of the flexible diaphragm 95 provides a relatively high radial stiffness (to transmit torque between the output shaft 72*a* and the drive pinion 60) but low axial stiffness (to allow rotation of the drive pinion 60 relative to the drive axis X of the output shaft 72*a*). The flexible coupling 90*a* permits a similar degree of rotation between the drive pinion 60 and the drive axis X of around 2 to 3 degrees and possibly up to as much as 5 degrees.

Figure 14:
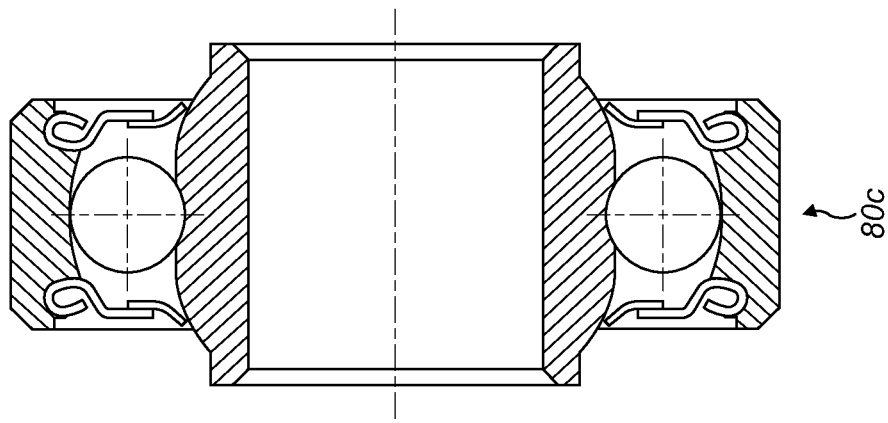
FIGS. 12 to 14 illustrate alternative self-aligning bearings.
Figure 13:
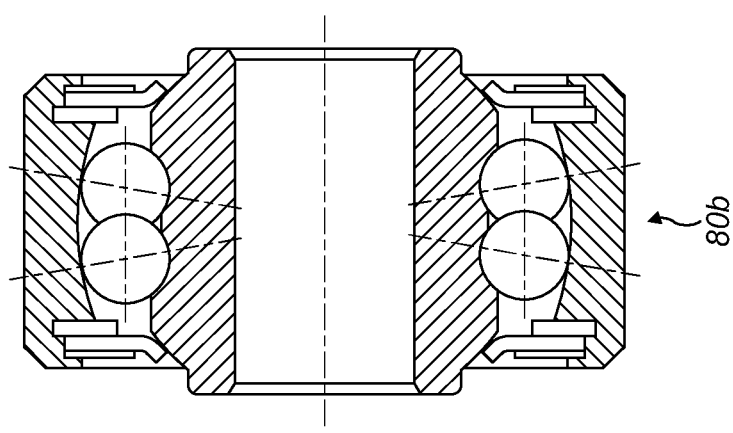
Figure 12:
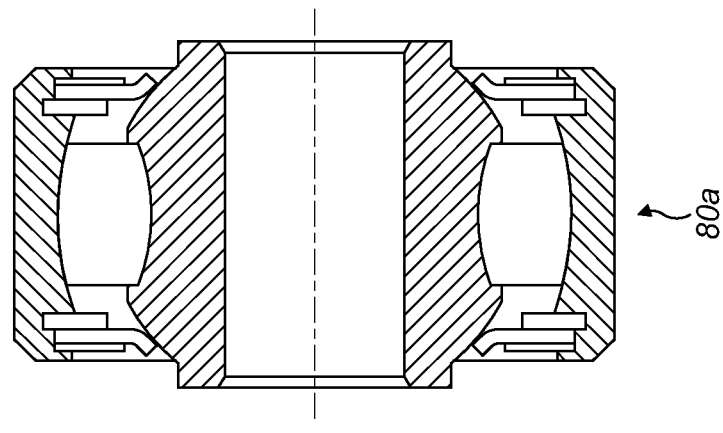

It will be appreciated that whilst in the embodiments described above the self-aligning bearing 80 is a two-row spherical roller bearing, other self-aligning bearings may be used instead to the same effects. Alternative self-aligning bearings are illustrated in FIGS. 12 to 14. FIG. 12 illustrates a single-row spherical roller (or barrel bearing) 80*a*; FIG. 13 illustrates a ball radial spherical double-row bearing 80*b*; and FIG. 14 illustrates a ball radial spherical single-row bearing 80*c*. Each of these bearing types is a rolling element bearing including a spherical outer raceway. These, and other mis-alignment (or self-aligning) bearings may be used with this invention.

Figure 15:
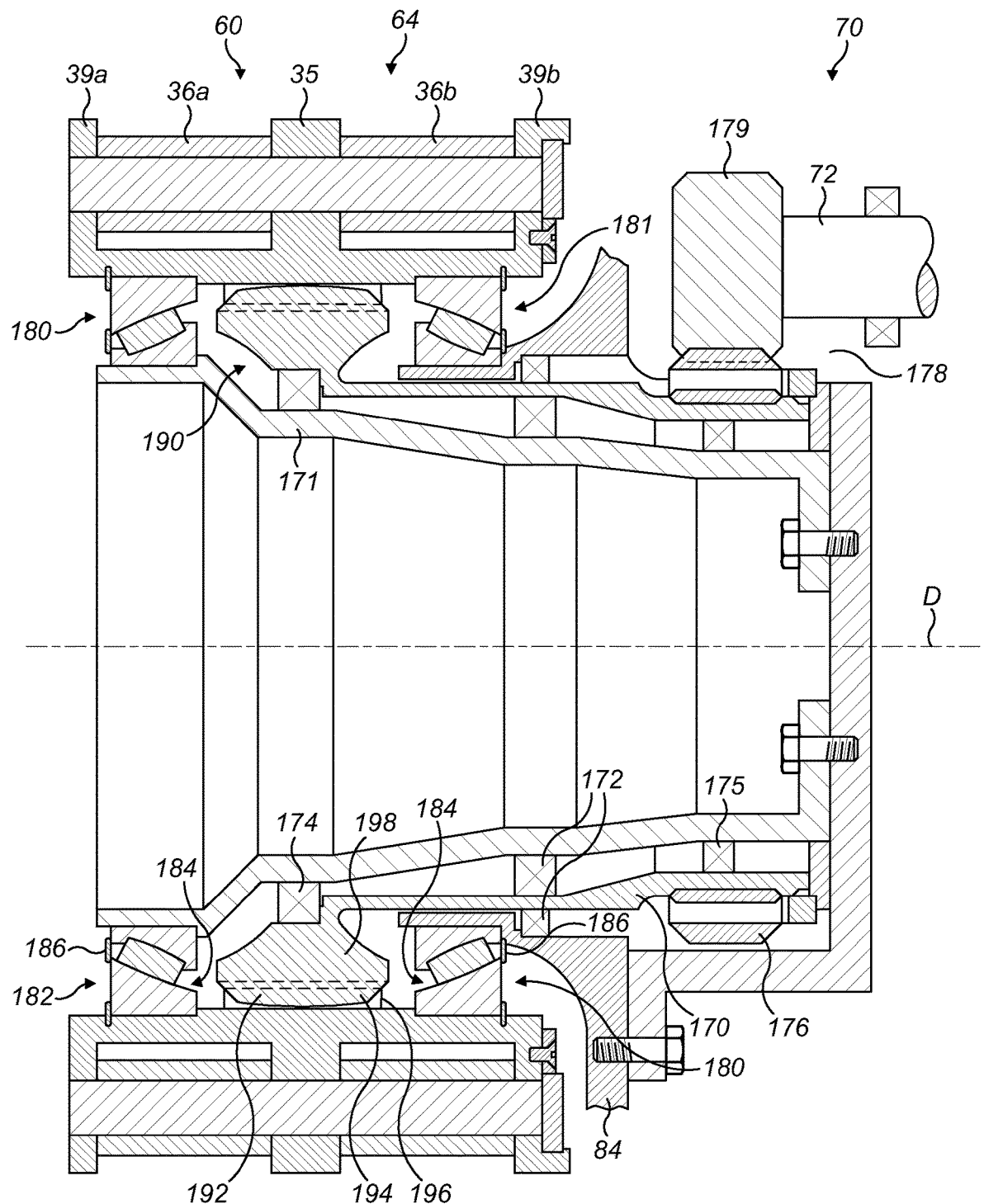
FIG. 15 shows a cross section view of another embodiment in which the self-aligning bearing is split either side of the flexible coupling and the drive pinion is rotatable about an axis parallel to the axis of rotation of the gearbox output shaft.

FIG. 15 illustrates an alternative embodiment in which the drive pinion 60 (roller gear 64) is coupled to a drive shaft 170 for rotation about a drive axis D. A support structure 171 is fixed to the gearbox casing 84 and extends inside the diameter of the drive shaft 170. A self-aligning bearing indicated generally by reference numeral 180 rotatably supports the drive pinion 60 on the gearbox housing 84 and the support structure 171. The self-aligning bearing 180 comprises an inner self-aligning bearing 181 between the drive pinion 60 and the gear box casing 84, and an outer self-aligning bearing 182 between the drive pinion 60 and the support structure 171. The inner and outer self-aligning bearings 181, 182 each comprise single row spherical rollers (or barrel bearings) similar to those described with reference to FIG. 12 above. The self-aligning bearing 180 is disposed substantially centrally across the width of the drive pinion 60. That is to say, the centre of the self-aligning bearing 180 is coincident with the annular ring 35 of the roller gear 64.

The drive pinion 60 is coupled to the drive shaft 170 by a flexible coupling 190 to transfer torque between the drive shaft 170 and the drive pinion 60 and to permit tilting of the drive pinion 60, relative to the drive axis D of the drive shaft 170. In the embodiment illustrated in FIG. 15, the flexible coupling 190 comprises a crowned spline joint 192. The crowned spline joint includes a plurality of external crowned splines 194, received within a corresponding plurality of internal straight splines 196. The internal straight splines are integrally formed in the centre of the drive pinion 60, or may alternatively be formed in a separate component attached to the inner diameter at the centre of the drive pinion 60. The external crowned splines 194 are integrally formed with a hub 198 integrally formed with the distal end of the drive shaft 170. The substantially rigid hub 198 provides minimal deflection between the crowned spline component and the drive shaft 170. The external crowned splines 194 can tilt relative to the internal straight splines 196 of the crowned spline joint 192 so as to provide rotation between the drive pinion 60 and the drive axis d of the drive shaft 170. The crowned spline joint 192 transfers torque between the drive shaft 170 and the drive pinion 60. In the embodiment illustrated in FIG. 15 the crowned splines 194 and the spherical inner surface of the outer raceway 184 of the self-aligning bearings are concentric spheres, although this is not necessary.

The drive shaft 170 is supported for rotation with respect to the gearbox housing 84 by an inter-shaft bearing arrangement 172. The inter-shaft bearing arrangement provides support for the drive shaft from the gearbox housing 84. The hub 198 is rotatably supported by the support structure 171 by bearing 174.

A pinion gear 176 is splined or otherwise fixed to a proximal end of the drive shaft 170 opposite the distal end having the hub 198. The proximal end of the drive shaft is rotatably supported by the support structure 171 by bearing 175. The support structure 171 has at least one aperture 178 to allow drive torque to be introduced to the pinion gear 176. In the embodiment illustrated in FIG. 15, an output shaft 72 of the gearbox 70 has an output gear 179 in permanent meshing engagement with the pinion gear 176. In alternative embodiments, a plurality (eg. 2, 3 or more) of the apertures 178 may be provided, each permitting a respective output gear 179 of the gearbox to introduce drive torque to the pinion gear 76 and thereby to transmit this torque via the drive shaft 170 and the flexible coupling 190 (crowned spline joint 192) to the drive pinion 60 (roller gear 64).

As compared with the embodiments described above with reference to FIGS. 6-11, the embodiment of FIG. 15 is advantageous in that the diameter of the crowned spline joint 192 is increased to fit the inner diameter of the roller gear 64 with the two rows of spherical rollers of the self-aligning bearing 180 split such that one row of rollers is positioned on each side of the crowed spline joint 192. The larger diameter of the crowned spline joint significantly increases the transmission torque of the crowned spline joint 192. Further advantageously, since the inner and outer self-aligning bearings 181, 182 are supported by the gearbox casing 84 and the support structure 171 respectively, this allows for stiffness tuning so as to ensure that the inner and outer self-aligning bearings 181, 182 can be evenly loaded, or their loadings can advantageously be tuned to give unequal loadings as desired.

Similar to the embodiments as described above, the self-aligning bearing 180 and flexible coupling 190 enable the pinion gear 60 to tilt with respect to the drive axis D of the drive shaft 170 so as to accommodate the angular deflection of approximately 1.5 to 3 degrees with respect to the axis of rotation of the driven gear 20 under the deformation modes discussed above, and may accommodate larger angular deflections of up to around 5 degrees. The self-aligning bearing 180 and the flexible coupling 190 therefore serve to isolate the gearbox 70 from the landing gear deformations discussed above.

Figure 16:
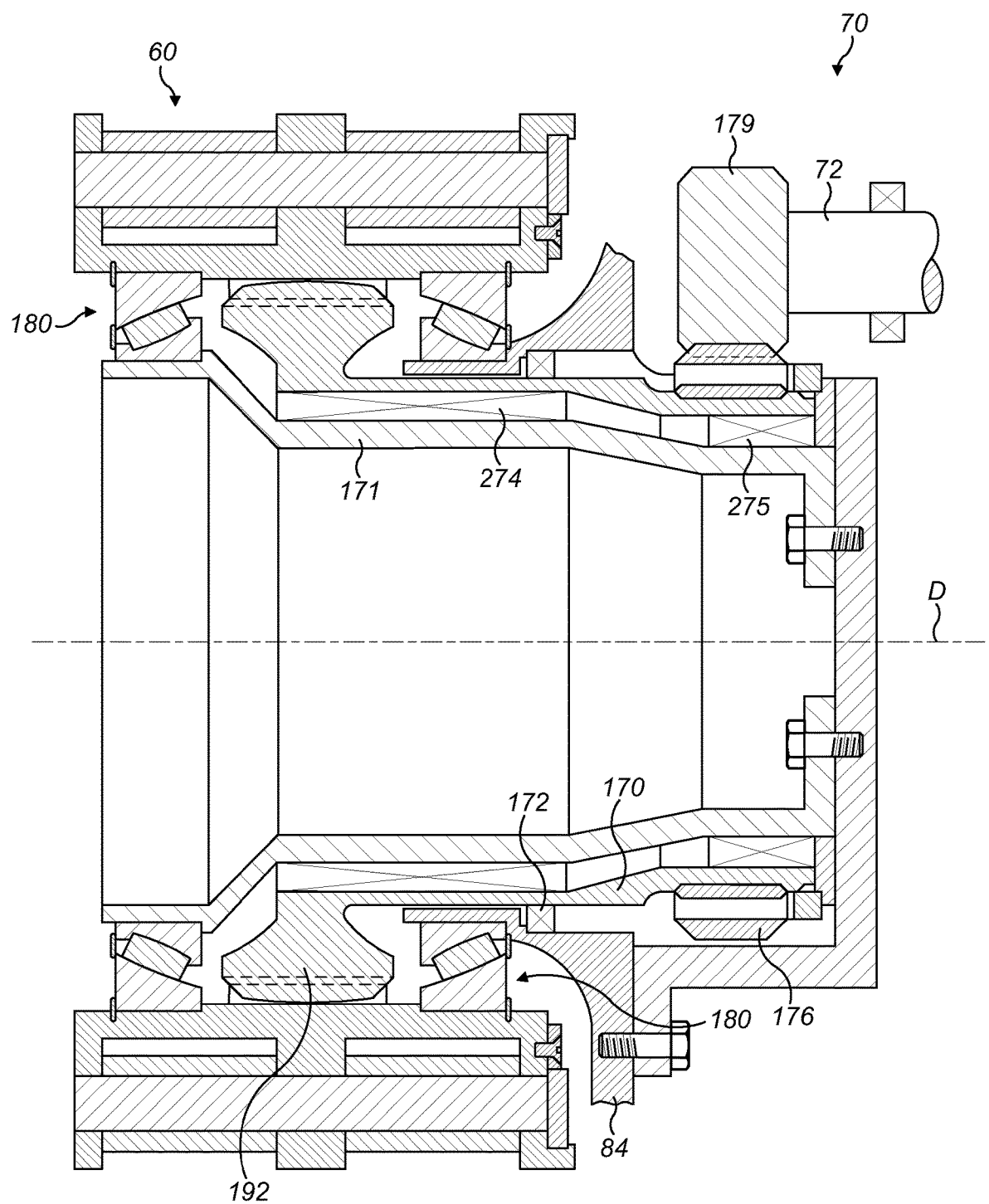
FIG. 16 shows a cross section view of a first variant of the embodiment shown in FIG. 15.

A variant of the embodiment described above with reference to FIG. 15 is shown in FIG. 16 in which like reference numerals have been used to denote like parts and only the differences will be described in the following. Needle roller bearings 274, 275 are provided to rotatably support the drive shaft 170 from the support structure 171. Needle roller 274 extends from the crowned spline joint 192 to the inter-shaft bearing 172, and needle roller 275 is positioned beneath the pinion gear 176. The needle rollers advantageously spread the bearing load as compared with the plain bearings 172, 174, 175 shown in FIG. 15.

Figure 17:
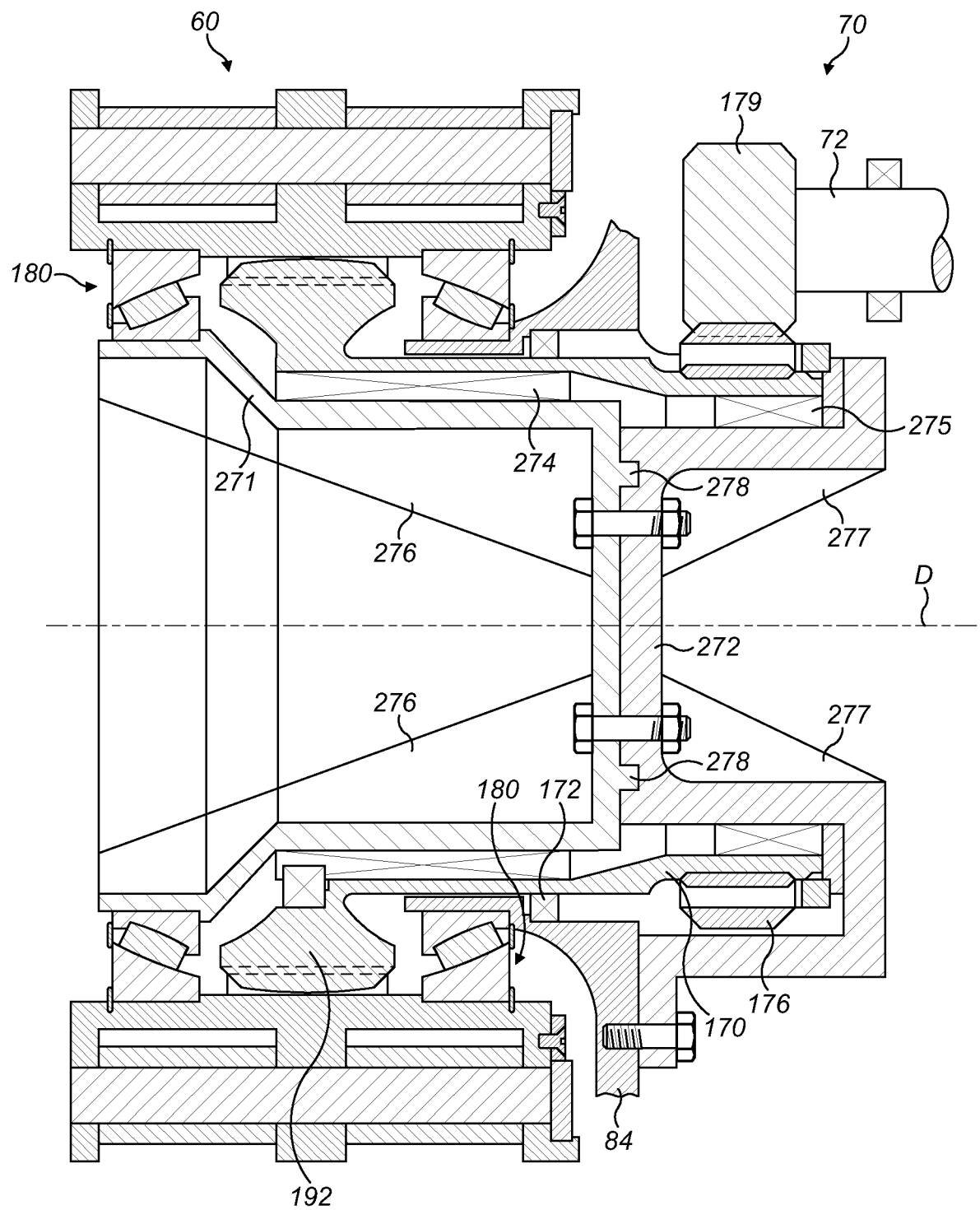
FIG. 17 shows a cross section view of a second variant of the embodiment shown in FIG. 15.

FIG. 17 illustrates a second variant of the embodiment described above with reference to FIG. 15, in which like reference numerals have been used to denote like parts and only the differences will be described below.

The support structure fixed to the gearbox housing 84 supporting the drive pinion 60 comprises a first support portion 271 bolted to a second support portion 272. The bolting line is substantially coincident with the outer wall of the gearbox casing 84. As compared with the FIG. 16 embodiment described above, moments about the bolting line are reduced. Each of the first and second support portions 271, 272 include internal stiffening webs 276, 277 respectively. In all other respects the mounting of the drive pinion 60 is identical to that described above with reference to FIG. 16.

The second variant described above with reference to FIG. 17 is advantageous in that the support structure for supporting the drive pinion 60 can be made stiffer or light-weighted. The first and second portions of the support structure 271, 272 may be located by concentric locating grooves 278, or similar.

Figure 18:
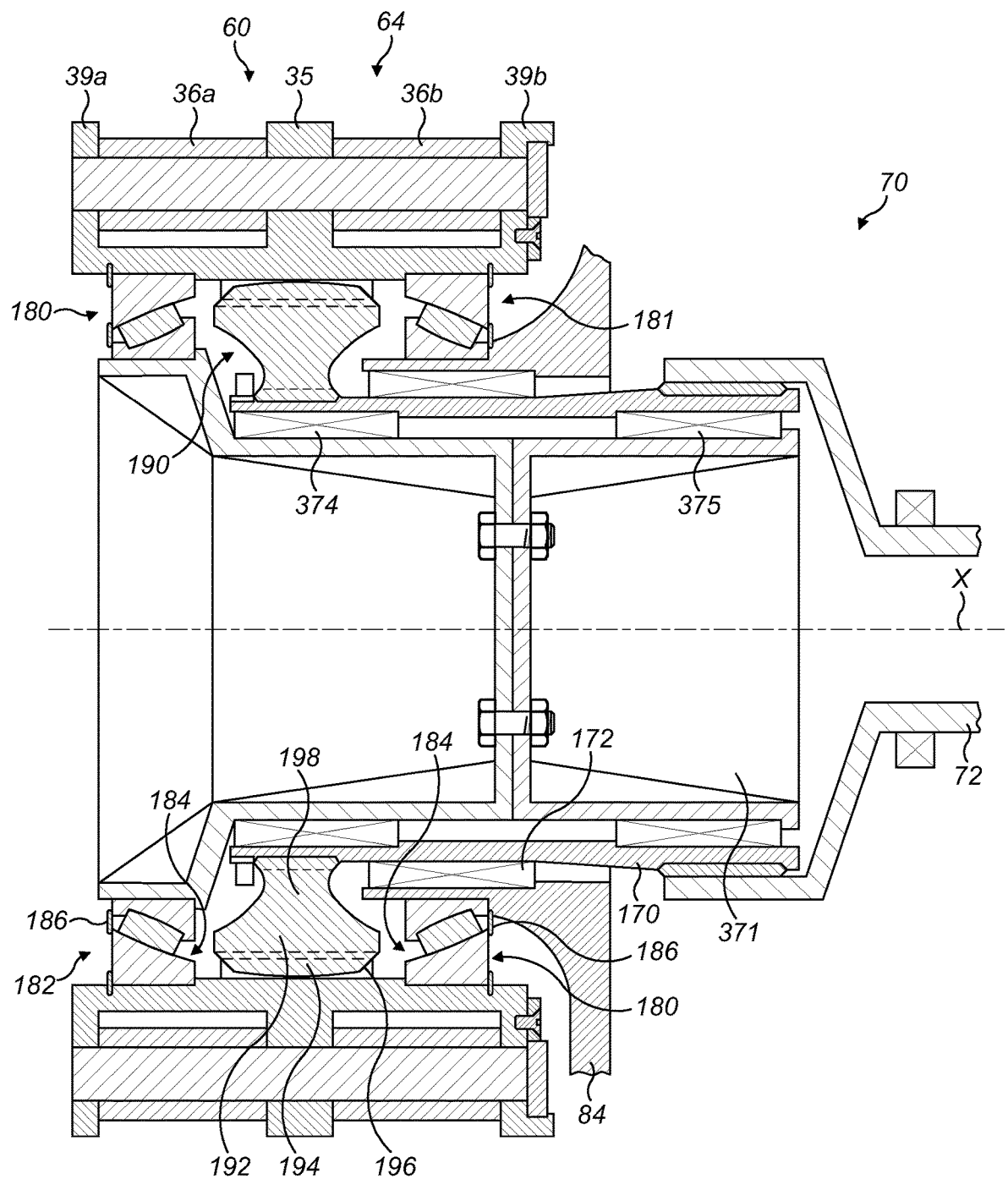
FIG. 18 shows a cross section view of a further embodiment in which the self-aligning bearing is split either side of the flexible coupling and the drive pinion is rotatable about the axis of rotation of the gearbox output shaft.

FIG. 18 illustrates a further embodiment similar in many respects to the embodiment shown in FIG. 15 and in which like reference numerals have been used to denote like parts.

In FIG. 18 the drive pinion 60 (roller gear 64) is coupled to a drive shaft 170 for rotation about a drive axis X. A support structure 371 extends inside the diameter of the drive shaft 170. Self-aligning bearing 180 rotatably supports the drive pinion 60 on the gearbox housing 84 and support structure 371. The self-aligning bearing 180 comprises inner self-aligning bearing 181 between the drive pinion 60 and the gear box casing 84, and outer self-aligning bearing 182 between the drive pinion 60 and the support structure 371. The self-aligning bearing 180 is disposed substantially centrally across the width of the drive pinion 60, similar to the FIG. 15 embodiment.

The drive pinion 60 is coupled to the drive shaft 170 by flexible coupling 190 comprising crowned spline joint 192, similar to the FIG. 15 embodiment, and includes a plurality of external crowned splines 194 on a hub 198 of the drive shaft 170, and a plurality of internal straight splines 196 formed in the centre of the drive pinion 60.

The drive shaft 170 is supported for rotation with respect to the gearbox housing 84 by an inter-shaft bearing arrangement 172. The inter-shaft bearing arrangement provides support for the drive shaft from the gearbox housing 84. The hub 198 is rotatably supported by the support structure 371 by needle roller bearing 374. The support structure 371 is formed in two cup parts bolted back to back for ease of assembly and to hold captive on the needle roller bearings 374, 375.

The output shaft 72 of the gearbox 70 is formed as a cup splined onto the proximal end of the drive shaft 170 opposite the distal end having the hub 198. The proximal end of the drive shaft is rotatably supported by the support structure 371 by needle roller bearing 375. The output shaft 72 is rotatable about the axis of rotation X of the drive pinion 60.

Unlike the embodiments shown in FIGS. 15 to 17, in the embodiment of FIG. 18 the support structure 371 is not fixed to the gearbox housing 84. Instead the support structure is free to rotate relative to the gearbox housing 84 (but is not driven to rotate).

Similar to the embodiments as described above, the self-aligning bearing 180 and flexible coupling 190 enable the pinion gear 60 to tilt with respect to the drive axis X of the drive shaft 170 so as to accommodate the angular deflection of approximately 1.5 to 3 degrees with respect to the axis of rotation of the driven gear 20 under the deformation modes discussed above, and may accommodate larger angular deflections of up to around 5 degrees. The self-aligning bearing 180 and the flexible coupling 190 therefore serve to isolate the gearbox 70 from the landing gear deformations discussed above.

Figure 19:
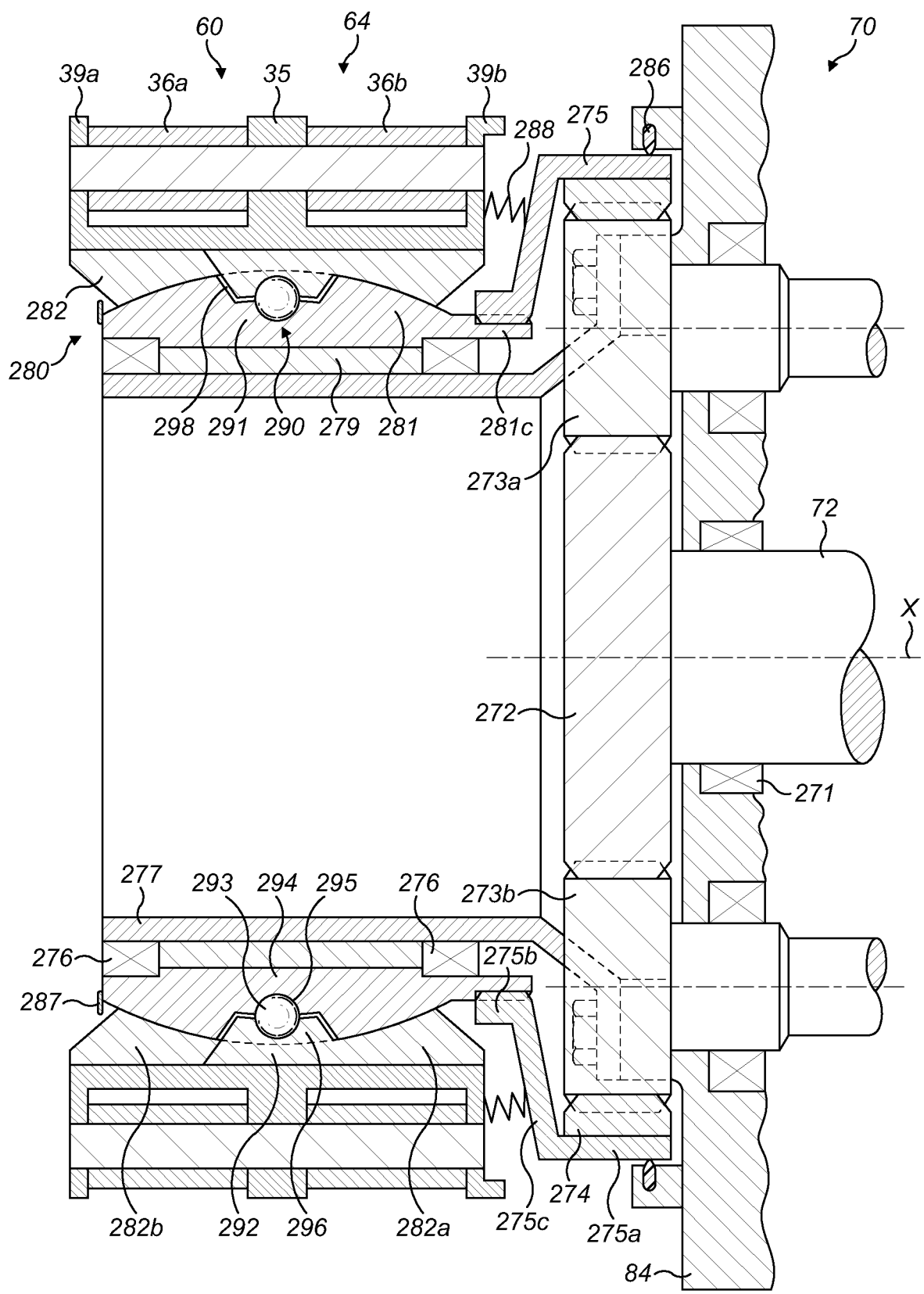
FIG. 19 shows a cross section view of a yet further embodiment in which the flexible coupling is arranged as a constant velocity joint within a ball spherical self-aligning bearing and the drive pinion is rotatable about an axis parallel to the axis of rotation of the gearbox output shaft via idler gears.
Figure 20:
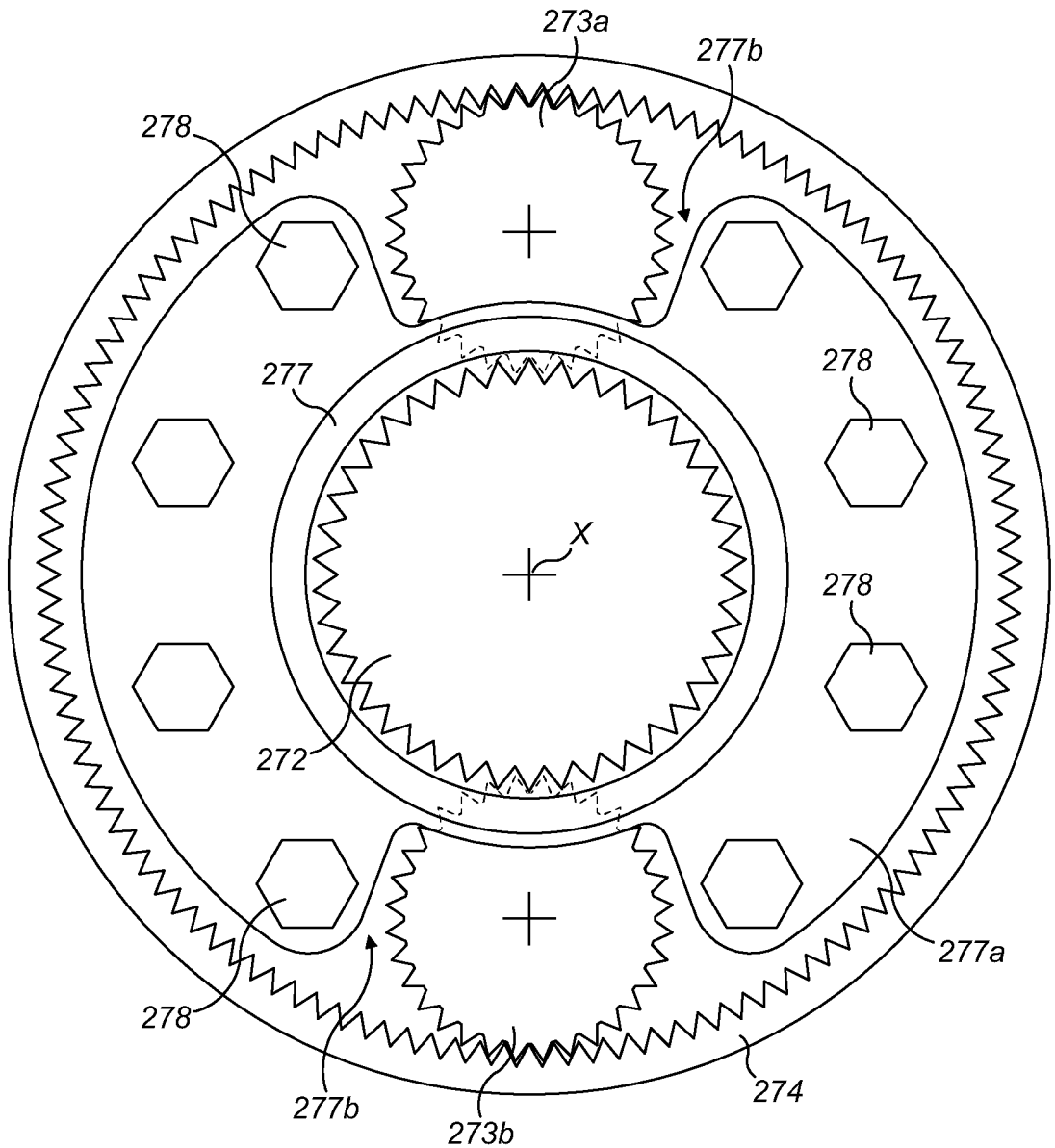
FIG. 20 illustrates a section view of the output shaft and idler gears of the FIG. 19 embodiment.

FIGS. 19 and 20 illustrate a further embodiment in which the drive pinion 60 is once again formed as a roller gear 64 in an identical manner to that described above with reference to FIG. 15 and in which like reference numerals have been used to denote like parts. The gearbox indicated generally by reference numeral 70 provides a drive path between the motor 52 (not shown) and the drive pinion 60. An output shaft (or drive shaft) 72 of the gearbox extends through and out of gearbox casing 84 and is rotatably supported by a bearing 271 in the wall of the casing 84. The drive shaft 72 carries a drive gear 272 fixed in rotation to the drive shaft 72. The drive shaft 72 rotates about an axis X coincident with the axis of rotation of the drive pinion 60. The drive gear 272 is in permanent meshing engagement with two idler gears 273a, 273b each rotatable about axes spaced diametrically about the drive axis X.

The idler gears 273a, 273b are in permanent meshing engagement with ring gear 274 rotatable about the drive axis X. The ring gear has radially inwardly extending teeth and an outer diametric surface is fixed to a hub 275. The connection between the hub 275 and the ring gear 274 may be a spline fit or a freeze press fit, for example. The hub 275 has an outer cylindrical portion 275a, an inner cylindrical portion 275b and a conical portion 275c extending between the outer and inner portions 275a. 275b. The outer cylindrical portion 275a is sealed by seal 286 to the gearbox casing 84. The inner cylindrical portion 275b of the hub transmits torque to a flexible coupling 290 configured as a constant velocity joint (CVJ) 291 adapted to transfer torque between the drive pinion 60 (roller gear 64) and the drive shaft 72 whilst permitting tilting of the drive pinion 60 relative to the drive axis X.

In the embodiment shown in FIG. 19, the CVJ is configured as a Rzeppa type joint comprising an outer raceway 292 with a series of part spherical pockets 196 each adapted to receive a respective spherical ball bearing 293 of which there are 12 in the illustrated embodiment although it will be appreciated that a greater or lesser number than this may be provided as desired. The Rzeppa type CVJ 291 further comprises an inner raceway 294 having a plurality of blind slots 295 each for receiving a respective one of the spherical ball bearings 293.

The CVJ flexible coupling 290 is located substantially centrally across a self-aligning bearing 280 comprising a part spherical inner raceway 281 and a part spherical outer raceway 282. The part spherical outer raceway 282 has an outer diametric surface fixed to the inner diameter of the drive pinion 60 (roller gear 64). The drive pinion 60 and outer spherical raceway 282 may be splined so that the drive pinion 60 rotates with the outer spherical raceway 282 about the drive axis X. The outer spherical raceway 282 may be formed in two parts 282a, 282b for ease of assembly upon the spherical inner raceway 281. The inner spherical raceway 281 may be formed in bronze or stainless steel, for example, and is rotatably supported by bearing 276 to a fixed support tube 277 fixedly mounted to the gearbox casing 84. The support tube 277 has a central axis coincident with the drive axis X and in the illustrated embodiment is fixed to the casing 84 by a radial flange 277a with bolts 278. The flange 277a includes cut outs 277b which receive the idler gears 273a 273b. The support tube 277 may include internal reinforcing webs, if necessary.

The inner raceway 281 is freely rotatable on bearings 276 about support tube 277 and a spacer tube 279 is positioned between the bearings 276 which are preferably disposed as far apart as possible across the width of the support tube 277. The inner spherical raceway 281 comprises a flange extension 281c extending about the drive axis X which is fixed to the inner cylindrical portion 275b of the hub 275. The flange 281c and the hub portion 275b are fixed so as to transmit torque between the hub 275 and the inner spherical ball 281. The connection between the hub and the inner spherical ball may be a spline fit to permit ready assembly and disassembly but alternatively may be bolted or permanently fixed e.g. by welding or an interference fit.

The bearings 276 may be needle or roller bearings or other suitable straight bearings may be used alternatively. A lip seal 287 may be used to seal between the inner spherical ball 281 and the outer spherical 282 of the self-aligning bearing 280.

The inner raceway 291 of the self-aligning bearing 290 is provided in a recess in the inner spherical ball 281 and the outer raceway 292 is provided as a projection from the outer spherical 282 such that a clearance gap 298 is provided between the edges of the inner and outer raceways 291, 292 so as to permit angular misalignment between the axis of rotation of the inner and outer sphericals 281, 282 of the misalignment (self-aligning) bearing 280 by relative movement between the spherical surfaces of the inner and outer sphericals 281, 282. During this movement the ball bearings 293 of the constant velocity joint 291 move substantially laterally within the slots 296 to allow this rotation whilst maintaining the transfer of torque between the inner and outer raceways 292, 294 of the flexible coupling 290 so as to transmit torque between the drive shaft 72 and the drive pinion 60. The clearance gap 298 may be arranged to allow up to around 3 to 5 degrees of rotation between the axis of rotation of the drive pinion 60 and the drive axis X. A flexible seal 288 between the hub 275 and the drive pinion 60 together with the lip seal 287 maintains a sealed environment for the self-aligning bearing 280 and the flexible coupling 290 throughout the range of misalignment between the axis of rotation of the drive pinion 60 and the drive axis X.

The embodiment illustrated in FIGS. 19 and 20 is advantageous in that it provides a stiff support tube 277, few bearings and robust load paths and is relatively easy to seal. In a variant of the embodiment illustrated in FIGS. 19 and 20 a crowned spline joint similar to that illustrated in FIG. 15 may be used instead of the CVJ 291. Although in the embodiment illustrated in FIGS. 19 and 20 the ring gear 274 is driven from the drive shaft 72 by drive gear 272 and a pair of idler gears 273a, 273b it will be appreciated that a different number of idler gears may be used, for example 1, or 3 or more. Alternatively, the ring gear 274 may be driven by a single output gear attached to the drive shaft 72 where the drive shaft 72 has an axis of rotation spaced from the drive axis X. Further alternatively, the ring gear may have radially outwardly projecting teeth for meshing engagement with one or more idler gears or a single drive gear mounted on the drive shaft 72 and alternative variants may be combined in any suitable combination as will be appreciated by those skilled in the art.

In a yet further variant (not shown) of the embodiment illustrated in FIGS. 19 and 20, the ring gear 274, drive gear 272 and idler gears 273a, 273b are omitted and the drive shaft 72 is extended through the support tube 277 to a drive wheel coupled in rotation with the drive shaft and splined or otherwise arranged to transmit torque between the drive shaft and the inner spherical 281. The drive wheel may be splined or otherwise arranged to transmit torque to the drive shaft 72. The inner spherical 281 may have a flange extension, similar to the flange extension 281c but on the other side of the self-aligning bearing 290, for engagement with the drive wheel. The drive wheel may be bolted or otherwise fixed to the distal end of the drive shaft 72. The support tube 277 may be shortened such that the drive wheel does not extend beyond the profile of the outer spherical 282.

The drive systems described above are suitable for ground taxiing operations, e.g. for driving an aircraft in either forwards or reverse directions. The motor 52 may be a motor-generator operable as either a motor for converting electrical energy into kinetic energy by applying a driving torque to rotate the landing gear wheel, or as a generator for converting kinetic energy of the aircraft into electrical energy by applying a braking torque to the landing gear wheel. The electrical energy generated by the generator is dissipated, e.g. by charging batteries to provide regenerative braking, or as heat. The motor may also be used to provide motorized braking for the landing gear wheel. Although the pinion and wheel gear are referred to as the "drive pinion" and the "driven gear" above, the pinion will actually be driven by the driving wheel gear when the motor-generator is used as a generator.

It will be appreciated that the motor may additionally or alternatively be used for wheel spin-up prior to landing. In some circumstances it may be necessary to provide an alternative drive path and/or a second motor for the wheel spin-up function due to the higher rotational speeds required for wheel spin-up as compared with ground taxiing. For example, the wheel 16 may be rotated at speeds of around 175 rpm (equivalent to 20 knots) during ground taxing, while the wheel 16 may be rotated at speeds of around 1400 rpm (equivalent to 160 knots ground speed) prior to touch down on landing.

The drive pinion 60 formed as a roller gear 64 having two co-axial rings of rollers and the driven gear 20 formed as a sprocket 66 having two co-axial rows of sprocket teeth for engaging the respective rings of rollers may be replaced with a roller gear having a single ring of rollers and a pinion having a single sprocket, or any multiple rows of rollers and sprocket teeth, e.g. three or four. Yet further, the driven gear may be formed as a roller chain gear for meshing with a sprocket. The roller chain gear (not shown) may be formed as a roller chain fixed around the outer circumference of an extension ring mounted to the landing gear wheel so that it forms a continuous track around the extension ring. The driven gear may further include a plurality of multiple coaxial chains engagable by a pinion formed by multiple coaxial sprockets.

In each of the arrangements described above the principle of achieving drive via meshing between a sprocket and roller gear/roller chain can be applied when the drive pinion comprises the sprocket and the driven gear (wheel gear) comprises the roller gear/roller chain, and vice versa. Alternatively the drive pinion may be formed as a spur gear or other type of toothed gear, and the driven gear may be formed as a ring gear or other type of toothed gear (not shown).

Although the figures only show features of an embodiment of the drive system 50 for driving one of the wheels 16, it is intended that these features may (if desirable) be mirrored for the other wheel 16. That is, one drive system 50 may be provided for each wheel 16. For a landing gear 10 with four or more wheels 16, a drive system 50 may be provided for each of the wheels 16, or for only two of them. In embodiments in which only two of the wheels 16 are provided with drive systems 50, it may be necessary to provide further motors (not shown) to achieve pre-landing spin-up of the un-driven wheels, with ground taxiing being accomplished by the two drive systems 50. In other embodiments it may be possible to have one motor 52 shared between two drive systems 50. That is, the motor 52 may be arranged to rotate the input shaft of each drive system. A differential may be provided to enable the shared motor to drive two or more wheels at different rotational speeds.

Although the figures only show features of an embodiment where the motor and gearbox of the drive system 50 are supported by a bracket which is rigidly connected to the lower telescopic part 12*b* (slider)/axle 14 of the landing gear, the drive system 50 may alternatively be mounted on the upper telescopic part 12*a* (main fitting). The bracket may include an aperture providing access to a jacking point at the base of the slider. Alternatively, the drive system 50 may be mounted on a "grow-out" fitting of the landing gear structure rather than on a separate bracket part.

Although the invention has been described above with reference to one or more preferred embodiments, it will be appreciated that various changes or modifications may be made without departing from the scope of the invention as defined in the appended claims.

The invention claimed is:

1. A drive system for an aircraft landing gear, the drive system comprising:
    a drive pinion;
    a drive shaft arranged to rotate the drive pinion about a drive axis; and
    a casing which rotatably supports the drive shaft, wherein the drive pinion is rotatably supported on the casing by a self-aligning bearing, and wherein the drive pinion is coupled to the drive shaft by a flexible coupling adapted to transfer torque between the drive pinion and the drive shaft and to permit tilting of the drive pinion relative to the drive axis,
    wherein the self-aligning bearing includes a spherical outer raceway,
    wherein the self-aligning bearing includes a plurality of rolling elements arranged in one or more paths within the spherical outer raceway,
    wherein the flexible coupling comprises a crowned spline joint including external teeth and internal teeth, wherein the external teeth are provided on a component fixed to a hub which supports the drive pinion, and the internal teeth are provided on the drive shaft or on a component attached to the drive shaft; and
    wherein an inner surface of the spherical raceway of the self-aligning bearing and the crowned spline of the flexible coupling have substantially concentric spheres.

2. A drive system according to claim 1, wherein the self-aligning bearing is substantially centrally located across the width of the drive pinion.

3. A drive system according to claim 1, wherein the flexible coupling provides up to 5 degrees of rotation between the drive pinion and the drive axis.

4. A drive system according to claim 3, wherein the flexible coupling provides up to 2.5 degrees of rotation between the drive pinion and the drive axis.

5. A drive system according to claim 1, wherein the self-aligning bearing includes a plurality of rolling elements arranged in one or more raceways.

6. A drive system according to claim 5, wherein the rolling elements are ball bearings or spherical rollers.

7. A drive system according to claim 5, wherein the self-aligning bearing includes a spherical outer raceway.

8. A drive system according to claim 1, wherein the self-aligning bearing includes an inner spherical surface in proximity to an outer spherical surface.

9. A drive system according to claim 1, wherein the self-aligning bearing substantially prevents translation of the drive pinion along the drive axis.

10. A drive system according to claim 1, wherein the casing and the drive pinion each include a stop to prevent excessive rotation of the drive pinion with respect to the drive axis.

11. A drive system according to claim 1, further comprising a reduction gear arrangement, wherein the drive shaft is an output shaft of the reduction gear arrangement and the casing is a housing of the reduction gear arrangement.

12. A drive system according to claim 1, further comprising a reduction gear arrangement, wherein the drive shaft is coupled to an output shaft of the reduction gear arrangement and the casing is a housing of the reduction gear arrangement.

13. A drive system according to claim 1, wherein each of the series of rollers is rotatable about a pin, the pins being fixed at least at one end to an annular support member.

14. A drive system according to claim 1, wherein the driven gear is adapted to be mounted to a hub of the wheel.

15. A drive system according to claim 14, wherein the driven gear is adapted to be mounted to an outer rim of the hub.

16. A landing gear according to claim 1, wherein the drive system is mounted on a fitting of the landing gear.

17. A drive system according to claim 1, wherein the external teeth are integrally formed with the drive pinion.

18. A drive system according to claim 1, wherein the internal teeth are integrally formed with the drive shaft.

19. A drive system according to claim 1, wherein the flexible coupling permits some degree of misalignment between the drive shaft and drive pinion.

20. A drive system according to claim 1, wherein the drive pinion comprises a series of rollers and the driven gear comprises a sprocket.

* * * * *